US012580349B2

(12) United States Patent
He et al.

(10) Patent No.: US 12,580,349 B2
(45) Date of Patent: Mar. 17, 2026

(54) HIGH SPEED ELECTRICAL CONNECTOR

(71) Applicant: Amphenol Commercial Products (Chengdu) Co., Ltd., Chengdu (CN)

(72) Inventors: Rui He, Chengdu (CN); Xiaodong Hu, Chengdu (CN); Yaohua Hou, Chengdu (CN); Lei Liao, Shenzhen (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 344 days.

(21) Appl. No.: 18/354,816

(22) Filed: Jul. 19, 2023

(65) Prior Publication Data

US 2024/0072494 A1 Feb. 29, 2024

(30) Foreign Application Priority Data

Aug. 31, 2022 (CN) ......................... 202211054001.5
Aug. 31, 2022 (CN) ......................... 202222302962.5

(51) Int. Cl.
*H01R 12/73* (2011.01)
*H01R 12/72* (2011.01)
(Continued)

(52) U.S. Cl.
CPC ....... *H01R 13/6588* (2013.01); *H01R 12/721* (2013.01); *H01R 12/73* (2013.01); *H01R 13/6471* (2013.01); *H01R 43/24* (2013.01)

(58) Field of Classification Search
CPC .. H01R 12/721; H01R 12/73; H01R 13/6471; H01R 13/6588; H01R 43/24
See application file for complete search history.

(56) References Cited

U.S. PATENT DOCUMENTS 7,581,990 B2 9/2009 Kirk et al.
8,462,502 B2 6/2013 Hirano et al.
(Continued)

FOREIGN PATENT DOCUMENTS

CN 202585857 U 12/2012
CN 203205638 U 9/2013
(Continued)

OTHER PUBLICATIONS

[No Author Listed], SFF Committee SFF-8639 Specification for Multifunction 6X Unshielded Connector. Rev 2.1. Development. SNIA SFF TWG Technology Affiliate. May 26, 2017. 32 pages.
(Continued)

*Primary Examiner* — Abdullah A Riyami
*Assistant Examiner* — Thang H Nguyen
(74) *Attorney, Agent, or Firm* — Wolf, Greenfield & Sacks, P.C.

(57) ABSTRACT

A connector for use with high-speed signals. The connector includes a connector subassembly having conductors disposed in groups and a shielding shell at least partially encircling each group. Each conductor includes a mating end and a mounting end opposite the mating end. The shielding shell includes openings that expose contact surfaces of the conductors at the ends. The shielding shell is formed by attaching a second shell part to a first shell part. The first shell part has plateaus and valleys, and the second shell part is attached to the first shell part at the valleys, such that tubular structures are formed. The shielding shell includes contact surfaces disposed on the same planes with the contact surfaces of the conductors at the ends, respectively. Such a configuration meets signal integrity requirements in connectors designed for 64 Gbps and beyond, while conforming to a standard that constrains mating and mounting interfaces.

20 Claims, 18 Drawing Sheets

(51) Int. Cl.

| | |
|---|---|
| ***H01R 13/6471*** | (2011.01) |
| ***H01R 13/6588*** | (2011.01) |
| *H01R 43/24* | (2006.01) |

(56) References Cited

U.S. PATENT DOCUMENTS

| | | | | |
|---|---|---|---|---|
| 8,585,440 | B2 | 11/2013 | Jiang et al. | |
| 8,657,627 | B2 | 2/2014 | McNamara et al. | |
| 8,702,451 | B2 | 4/2014 | Luo et al. | |
| 8,740,631 | B2 | 6/2014 | Chen | |
| 8,858,243 | B2 | 10/2014 | Luo et al. | |
| 9,077,118 | B2 | 7/2015 | Szu et al. | |
| 9,225,090 | B2 | 12/2015 | Chen | |
| 9,407,022 | B1 | 8/2016 | Wang | |
| 9,520,680 | B2 | 12/2016 | Hsu et al. | |
| 9,564,714 | B1 | 2/2017 | Wang et al. | |
| 9,735,512 | B2 * | 8/2017 | Hsu | H01R 13/6596 |
| 9,831,605 | B2 | 11/2017 | Buck et al. | |
| 9,941,641 | B1 | 4/2018 | Jiang et al. | |
| 9,985,391 | B1 | 5/2018 | Wang | |
| 10,283,910 | B1 | 5/2019 | Chen et al. | |
| 10,411,376 | B1 | 9/2019 | Wang et al. | |
| 10,651,589 | B1 | 5/2020 | Wang et al. | |
| 10,763,608 | B1 | 9/2020 | Wang et al. | |
| 11,050,176 | B2 * | 6/2021 | Yang | H01R 43/02 |
| 11,251,554 | B1 * | 2/2022 | Tan | H01R 12/716 |
| 11,581,687 | B2 | 2/2023 | Wang et al. | |
| 2014/0004744 | A1 | 1/2014 | Hsu et al. | |
| 2014/0211389 | A1 | 7/2014 | Zhou et al. | |
| 2014/0242844 | A1 * | 8/2014 | Wanha | H01R 13/516<br>439/626 |
| 2018/0062323 | A1 * | 3/2018 | Kirk | H01R 13/6599 |
| 2018/0205181 | A1 | 7/2018 | Chen et al. | |
| 2019/0214753 | A1 | 7/2019 | Jiang et al. | |
| 2020/0028289 | A1 | 1/2020 | Dai et al. | |
| 2021/0044060 | A1 * | 2/2021 | Wu | H01R 12/725 |
| 2021/0399455 | A1 | 12/2021 | Wang et al. | |
| 2022/0077614 | A1 | 3/2022 | Tan et al. | |
| 2022/0302655 | A1 | 9/2022 | Wang et al. | |
| 2022/0352662 | A1 * | 11/2022 | Zhang | H01R 13/516 |
| 2022/0360000 | A1 | 11/2022 | Tan et al. | |
| 2023/0047671 | A1 | 2/2023 | Wang et al. | |
| 2023/0050934 | A1 * | 2/2023 | Yin | H01R 12/57 |
| 2023/0052801 | A1 * | 2/2023 | Liu | H01R 12/737 |
| 2023/0053625 | A1 * | 2/2023 | Wang | H01R 13/516 |
| 2023/0122686 | A1 | 4/2023 | Wang et al. | |
| 2023/0124724 | A1 | 4/2023 | Tan et al. | |
| 2023/0125645 | A1 | 4/2023 | Yin et al. | |
| 2023/0369784 | A1 * | 11/2023 | Hamner | H01R 12/722 |

FOREIGN PATENT DOCUMENTS

| | | | |
|---|---|---|---|
| CN | 103515792 | A | 1/2014 |
| CN | 203850501 | U | 9/2014 |
| CN | 104283080 | A | 1/2015 |
| CN | 204376132 | U | 6/2015 |
| CN | 205016785 | U | 2/2016 |
| CN | 103887641 | B | 6/2016 |
| CN | 205944534 | U | 2/2017 |
| CN | 206962152 | U | 2/2018 |
| CN | 207116835 | U | 3/2018 |
| CN | 207517943 | U | 6/2018 |
| CN | 109004437 | A | 12/2018 |
| CN | 208284706 | U | 12/2018 |
| CN | 208433570 | U | 1/2019 |
| CN | 209675519 | U | 11/2019 |
| CN | 109659740 | B | 9/2020 |
| CN | 112103723 | A | 12/2020 |
| CN | 212380677 | U | 1/2021 |
| CN | 111769395 | B | 2/2022 |
| CN | 215816686 | U | 2/2022 |
| CN | 217691950 | U | 10/2022 |
| TW | I505580 | B | 10/2015 |
| TW | I509921 | B | 11/2015 |
| TW | M546036 | U | 7/2017 |
| TW | M563682 | U | 7/2018 |
| TW | M573906 | U | 2/2019 |
| TW | M584561 | U | 10/2019 |
| TW | M606366 | U | 1/2021 |
| TW | M618868 | U | 11/2021 |
| TW | M621514 | U | 12/2021 |

OTHER PUBLICATIONS

[No Author Listed], SFF-TA-1001 Specification for Universal x4 Link Definition for SFF-8639. Rev 1.1. SNIA Advance storage & information technology. May 28, 2018. 20 pages.

Cao et al., High Speed Electrical Connector, U.S. Appl. No. 18/097,778, filed Jan. 17, 2023.

Cao et al., High Speed Electrical Connector, U.S. Appl. No. 18/097,805, filed Jan. 17, 2023.

Hou et al., High Speed Plug Connector, U.S. Appl. No. 18/323,469, filed May 25, 2023.

Mason et al., SAS Standards and Technology Update. Storage Developer Conference (SDC). 2011. 46 pages. URL:https://www.snia.org/sites/default/orig/SDC2011/presentations/monday/HarryMason_SAS%20_Standards_Technology_Updater1.pdf [last accessed Jun. 2, 2022].

Yang et al., PSAS Receptacle Connector, PSAS Plug Connector and Interconnection System Therewith, U.S. Appl. No. 18/240,401, filed Aug. 31, 2023.

Yin et al., High Speed, High Performance Electrical Connector, U.S. Appl. No. 18/448,239, filed Aug. 11, 2023.

* cited by examiner

HIGH SPEED ELECTRICAL CONNECTOR

RELATED APPLICATIONS

This application claims priority to and the benefit of Chinese Patent Application Serial No. 202222302962.5, filed on Aug. 31, 2022. This application also claims priority to and the benefit of Chinese Patent Application Serial No. 202211054001.5, filed on Aug. 31, 2022. The contents of these applications are incorporated herein by reference in their entirety.

FIELD

This application relates generally to electrical connectors, such as those used to interconnect electronic assemblies.

BACKGROUND

Electrical connectors are used in many electronic systems. It is generally easier and more cost effective to manufacture a system as separate electronic subassemblies, such as printed circuit boards (PCBs), which may be joined together with electrical connectors. Having separable connectors enables components of the electronic system manufactured by different manufacturers to be readily assembled. Separable connectors also enable components to be readily replaced after the system is assembled, either to replace defective components or to upgrade the system with higher performance components.

A known arrangement for joining several printed circuit boards is to have one printed circuit board serve as a backplane. A known backplane is a PCB onto which many connectors may be mounted. Conducting traces in the backplane may be electrically connected to signal conductors in the connectors so that signals may be routed between the connectors. Other printed circuit boards, called "daughterboards," "daughtercards," or "midboards," may be connected through the backplane. For example, daughtercards may also have connectors mounted thereon. The connectors mounted on a daughtercard may be plugged into the connectors mounted on the backplane. In this way, signals may be routed among daughtercards through the connectors and the backplane. The daughtercards may plug into the backplane at a right angle. The connectors used for these applications may therefore include a right angle bend and are often called "right angle connectors."

Connectors may also be used in other configurations for interconnecting printed circuit boards. Sometimes, one or more printed circuit boards may be connected to another printed circuit board, called a "motherboard," that is both populated with electronic components and interconnects the daughterboards. In such a configuration, the printed circuit boards connected to the motherboard may be called daughterboards. The daughterboards are often smaller than the motherboard and may sometimes be aligned parallel to the motherboard. Connectors used for this configuration are often called "stacking connectors" or "mezzanine connectors." In other systems, the daughterboards may be perpendicular to the motherboard.

For example, this configuration is often used in computers in which the motherboard might have a processor and a bus configured to pass data between the processor and peripherals, such as a graphics processor or memory. Connectors may be mounted to the motherboard and connected to the bus. The peripherals may be implemented on daughtercards with connectors that mate with the connectors on the bus such that separately manufactured peripherals may be readily integrated into a computer made with the motherboard.

To enhance the availability of peripherals, the bus and the connectors used to physically connect peripherals via the bus may be standardized. In this way, there may be a large number of peripherals available from a multitude of manufacturers. All of those products, so long as they are compliant with the standard, may be used in a computer that has a bus compliant with the standard. Examples of such standards include serial ATA (SATA), serial attached SCSI (SAS), peripheral component interconnect express (PCIe), or SFF-8639, which are commonly used in computers. The standards have gone through multiple revisions, adapting to the higher performance expected from computers over time.

BRIEF SUMMARY

Aspects of the present disclosure relate to high speed electrical connectors.

Some embodiments relate to a connector subassembly. The connector subassembly may include an insulative member; a plurality of conductive elements held by the insulative member in a row and disposed in a plurality of groups of conductive elements, each of the conductive elements comprising a mating end, a mounting end opposite the mating end, and an intermediate portion joining the mating end and the mounting end; and a shielding shell comprising a plurality of first openings and a plurality of second openings. The intermediate portions of the plurality of conductive elements may be disposed within the shielding shell such that the mating ends of the conductive elements in each group of the plurality of groups may be exposed through an opening of the plurality of first openings and the mounting ends of the conductive elements in each group of the plurality of groups may be exposed through an opening of the plurality of second openings.

In some embodiments, the plurality of groups may be spaced apart from each other in the row direction.

In some embodiments, the shielding shell may comprise a plurality of tubular structures, and each of the plurality of groups of conductive elements may be disposed within a respective tubular structure.

In some embodiments, the shielding shell may comprise a first shell part comprising a plurality of plateaus and valleys integrally formed in the first shell part, and each of the plurality of groups of conductive elements may be disposed adjacent a respective plateau of the plurality of plateaus.

In some embodiments, the insulative member may comprise a plurality of holding portions, each of the plurality of holding portions holding a respective group of the plurality of groups of conductive elements; and a plurality of connecting portions, integral with the plurality of holding portions, each of the plurality of connecting portions connecting adjacent holding portions of the plurality of holding portions.

In some embodiments, the shielding shell may comprise a plurality of mating ends and a plurality of mounting ends opposite to respective ones of the plurality of mating ends, and each of the plurality of mating ends of the shielding shell may be disposed between adjacent groups of conductive elements.

In some embodiments, the shielding shell may comprise a front piece at a side of the plurality of first openings.

In some embodiments, the front piece may be disposed beyond the mating ends of the plurality of signal conductors.

In some embodiments, the shielding shell may comprise a first shell part comprising plateaus and valleys, and a second shell part comprising the plurality of mating ends and the plurality of mounting ends. The second shell part may be attached to the first shell part at the valleys.

In some embodiments, the shell may comprise sides joining the plateaus and valleys. Each side extends perpendicular to the row along at least 50% of its length.

In some embodiments, for the plurality of signal conductors, the mating ends may comprise mating contact surfaces disposed on a first plane, and the mounting ends comprise mounting contact surfaces disposed on a second plane. For the shielding shell, the plurality of mating ends may comprise mating contact surfaces disposed on the first plane, and the plurality of mounting ends may comprise mounting contact surfaces disposed on the second plane.

In some embodiments, the second plane may be parallel to or perpendicular to the first plane.

Some embodiments relate to an electrical connector. The electrical connector may comprise a housing comprising a base portion and a wall extending from the base portion and having a first side and a second side; and any of the above-described the connector subassembly, the connector subassembly disposed on the first side of the wall.

In some embodiments, the wall of the housing may comprise a platform on the second side. The electrical connector may further comprise a plurality of conductive elements disposed on the second side of the wall.

Some embodiments relate to an electrical connector. The electrical connector may comprise a housing comprising a slot with a first side and a second side; and any of the above-described the connector subassembly disposed within the housing with the mating ends of the connector subassembly lining the first side of the slot.

In some embodiments, the slot of the housing may comprise a recess on the second side. The electrical connector may further comprise a plurality of conductive elements comprising mating ends lining the second side of the wall.

Some embodiments relate to an electrical connector. The connector subassembly may include an insulative member; a plurality of conductive elements held by the insulative member in a row and disposed in a plurality of groups of conductive elements, the plurality of conductive elements each comprising a mating end comprising a distal end, a mounting end opposite the mating end, and an intermediate portion joining the mating end and the mounting end; and a shell part comprising plateaus and valleys. The valleys may be disposed between adjacent groups of the plurality of groups of conductive elements. The plateaus may be spaced from the plurality of groups of conductive elements and extend at least from the distal ends of the mating ends of the plurality of conductive elements to the insulative member.

In some embodiments, the shell part may extend from a first surface to a second surface. The first surface of the plateaus may be spaced from the row by a first distance in a first direction. The second surface of the valleys may be spaced from the row by the first distance in a second direction opposite the first direction.

In some embodiments, the insulative member may comprise portions between the groups of conductive elements. The shell part may comprise openings that separate the valleys into a first portion and a second portion. The portions of the insulative member may be inserted between the first and second portions of the valleys of the shell part.

In some embodiments, the shell part may comprise a plurality of subparts each comprising at least one plateaus and at least a portion of at least one valley. The plurality of subparts may be connected to each other at the valleys.

In some embodiments, the shell part may comprise a plurality of extensions each extending from one of the plateaus and surrounding one or more sides of a portion of the mounting ends of the conductive elements of the group corresponding to the plateau.

In some embodiments, each of the plurality of extensions may comprise one or more flaps aligned with respective sides and/or valleys.

In some embodiments, the shell part may be a first shell part. The connector subassembly may comprise a second shell part comprising a body portion, a plurality of mating ends extending from the body portion and disposed between the mating ends of the conductive elements of adjacent groups, and a plurality of mounting ends extending from the body portion and each corresponding to one of the plurality of mating ends. The second shell part may be attached to the first shell part at the valleys.

In some embodiments, the second shell part may comprise a front piece disposed beyond the mating ends of the plurality of conductive elements.

In some embodiments, the front piece of the second shell part may extend perpendicular to the plateaus of the first shell part.

In some embodiments, the front piece of the second shell part may connect the plurality of mating ends of the second shell part.

In some embodiments, the second shell part may comprise a plurality of rear pieces extending from the body portion and configured to form loops with corresponding extensions of the first shell part.

In some embodiments, for the plurality of conductive elements, the mating ends may comprise mating contact surfaces disposed on a first plane, and the mounting ends comprise mounting contact surfaces disposed on a second plane. For the second shell part, the plurality of mating ends may comprise mating contact surfaces disposed on the first plane, and the plurality of mounting ends comprise mounting contact surfaces disposed on the second plane.

Some embodiments relate to a method of manufacturing a connector subassembly comprising a plurality of conductive elements each comprising a mating end, a mounting end opposite the mating end, and an intermediate portion joining the mating end and the mounting end. The method may include providing a first shell part; providing a second shell part; molding an insulative plastic over portions of the intermediate portions of the plurality of conductive elements such that the plurality of conductive elements are disposed in a row in an edge-to-edge configuration; inserting the plurality of conductive elements overmolded with the insulative plastic into the first shell part; and assembling the second shell part to the first shell part so as to form a shielding shell for the plurality of conductive elements.

In some embodiments, inserting the plurality of conductive elements overmolded with the insulative plastic into the first shell part may comprise aligning groups of conductive elements of the plurality of conductive elements with channels of the first shell part such that the plurality of conductive elements and the first shell part are aligned in a row direction, and aligning portions of the insulative plastic that are between adjacent groups of conductive elements with openings of the first shell part such that the plurality of conductive elements and the first shell part are aligned in a direction perpendicular to the row direction.

In some embodiments, assembling the second shell part to the first shell part so as to form a shielding shell for the plurality of conductive elements may comprise attaching selected portions of the second shell part to the first shell part.

In some embodiments, attaching the selected portions of the second shell part to the first shell part may comprise welding the selected portions of the second shell part to the first shell part.

In some embodiments, providing the first shell part may comprise folding and combining one or more metal sheets.

In some embodiments, providing the second shell part may comprise folding portions of a one-piece blank to form mounting ends having mounting contact surfaces. Assembling the second shell part to the first shell part may comprise disposing the mounting contact surfaces of the mounting ends of the second shell part in a same plane with mounting contact surfaces of the mounting ends of the plurality of conductive elements.

In some embodiments, providing the second shell part may comprise providing mating ends having mating contact surfaces. Assembling the second shell part to the first shell part may comprise disposing the mating contact surfaces of the mating ends of the second shell part in a same plane with mating contact surfaces of the mating ends of the plurality of conductive elements.

These techniques may be used alone or in any suitable combination. The foregoing summary is provided by way of illustration and is not intended to be limiting.

BRIEF DESCRIPTION OF DRAWINGS

The accompanying drawings may not be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
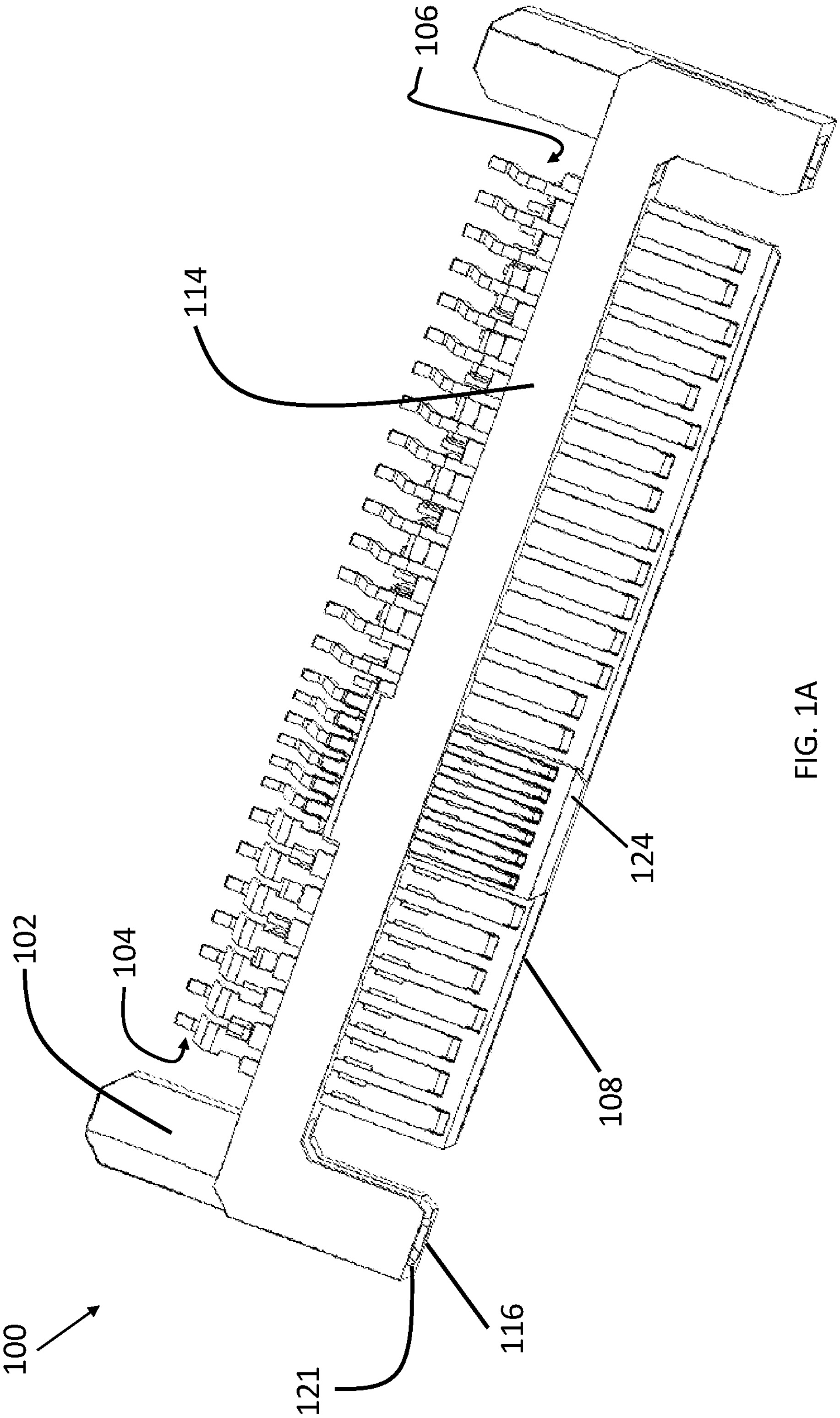
FIG. 1A is a top, front perspective view of a plug connector, showing a top row of conductive elements, according to some embodiments.
Figure 1B:
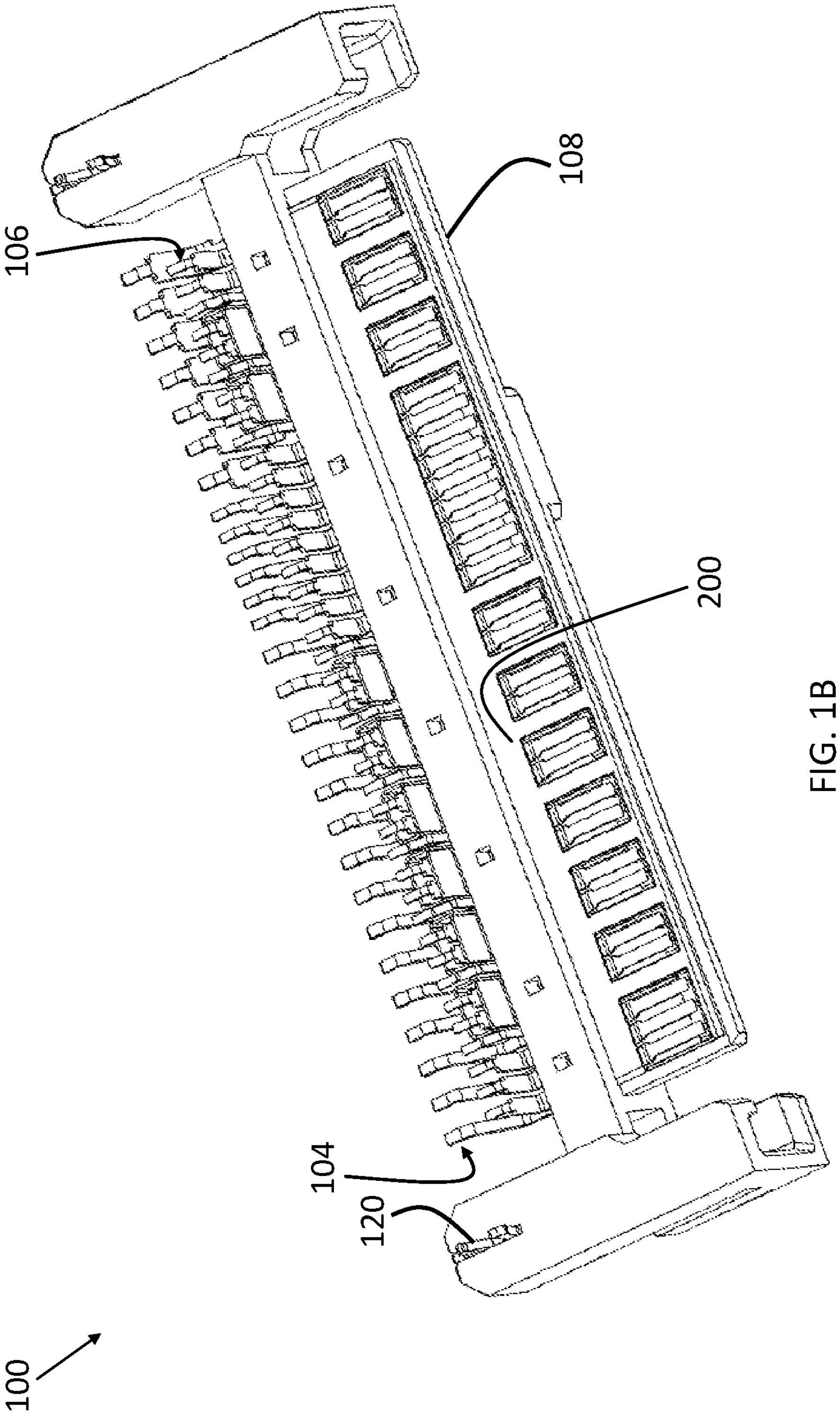
FIG. 1B is a bottom, rear perspective view of the plug connector of FIG. 1A, showing a bottom row of conductive elements.
Figure 1C:
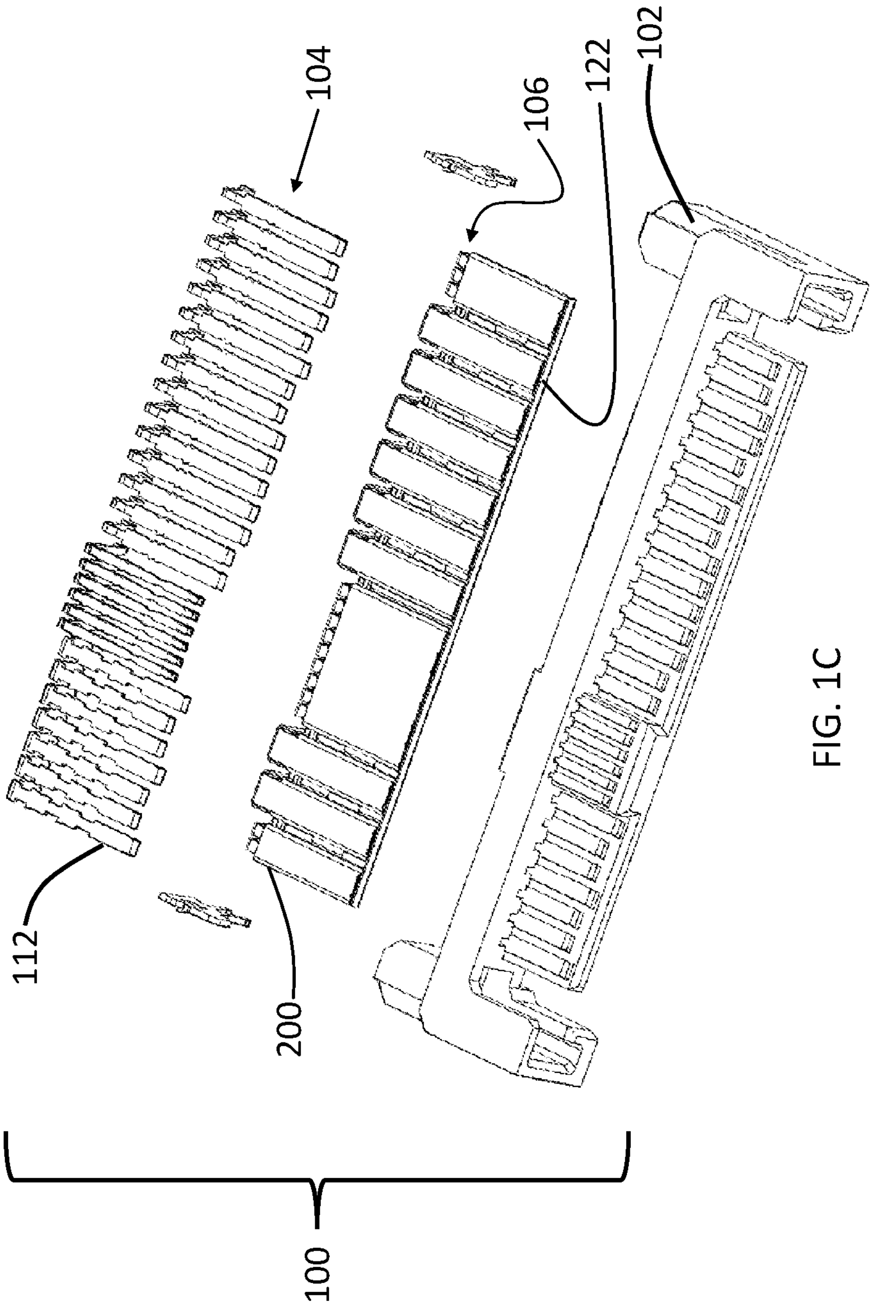
FIG. 1C is a partially exploded top perspective view of the plug connector of FIG. 1A.
Figure 1D:
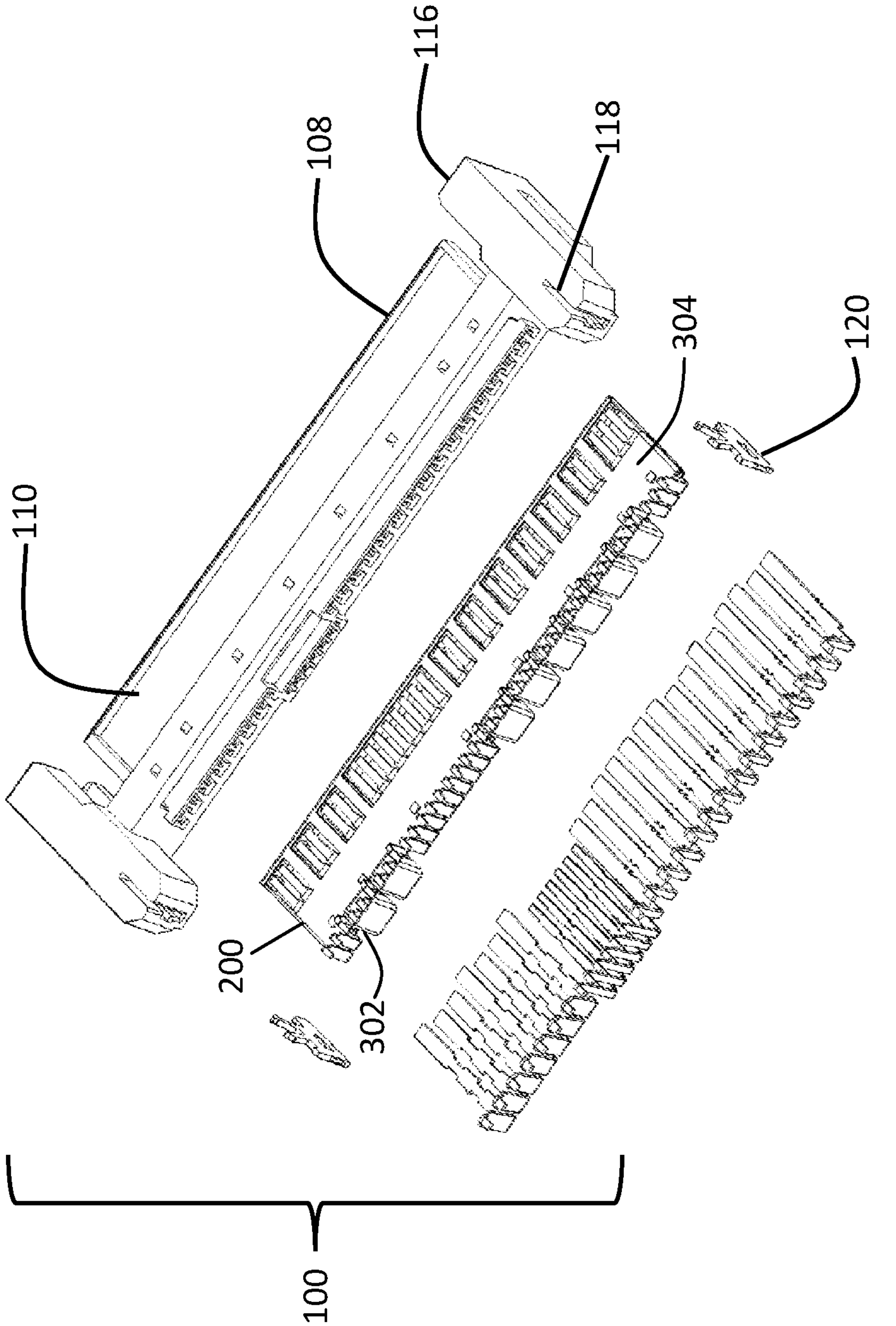
FIG. 1D is partially exploded bottom perspective view of the plug connector of FIG. 1A.
Figure 2A:
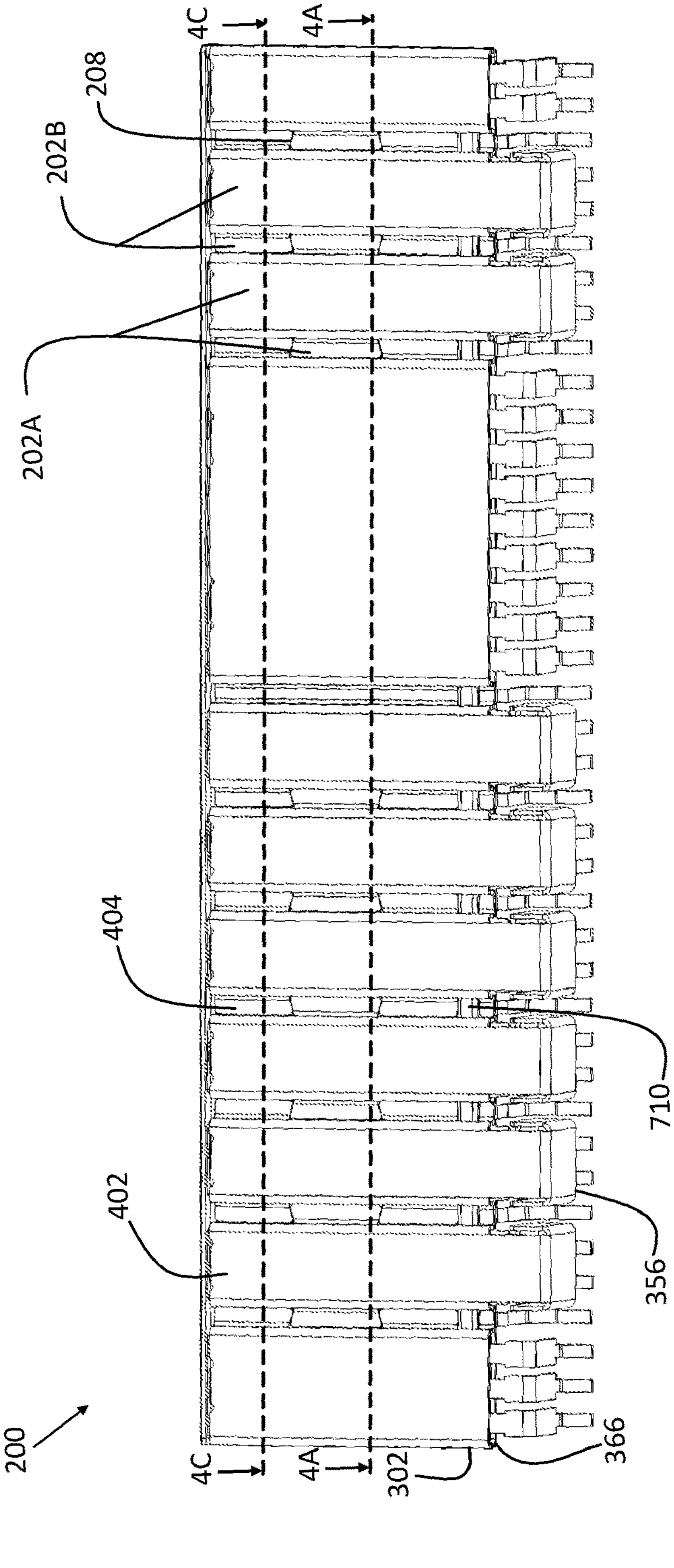
FIG. 2A is a top, rear perspective view of a connector subassembly of the plug connector of FIG. 1A.
Figure 2B:
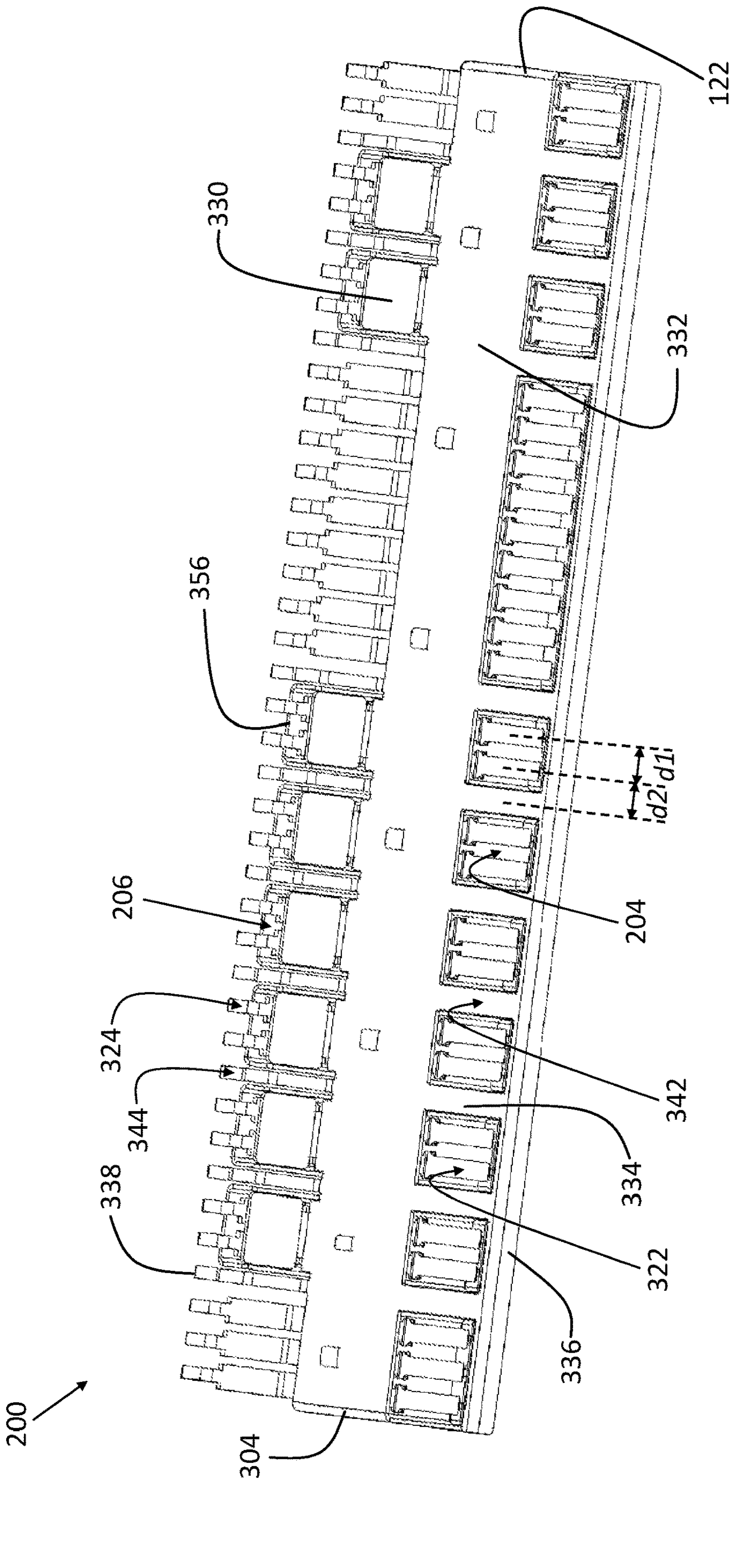
FIG. 2B is a bottom front perspective view of the connector subassembly of FIG. 2A.

The inventors have recognized and appreciated connector designs that satisfy electrical and mechanical requirements to support greater bandwidth through high frequency operation. Some of these techniques may synergistically support higher frequency connector operation, satisfy the physical requirements set by industry standards such as PCIeSAS, and meet requirements for mass manufacturing, including cost, time and reliability. A connector satisfying the mechanical requirements of the PCIeSAS specification at the performance required for GEN 6 and beyond is used as an example of a connector in which these techniques have been applied.

An electrical connector may have one or more rows of conductive elements. Some of the conductive elements in a row may serve as high-speed signal conductors. Optionally, some of the conductive elements may serve as low-speed signal conductors or power conductors. Some of the low-speed signal conductors and/or power conductors may also be designated as grounds, referencing the signals carried on the signal conductors or providing a return path for those signals. It should be appreciated that ground conductors need not to be connected to earth ground, but may carry reference potentials, which may include earth ground, DC voltages or other suitable reference potentials.

The conductive elements may each have a mating end comprising a mating contact surface, configured for mating with a complementary mating contact surface of another electrical component, such as a printed circuit board or a complementary connector. Each conductive element may also have a mounting end comprising a mounting contact surface, configured for mounting the connector to another electrical component, such as a printed circuit board or a cable. Each conductive element may also have an intermediate portion, joining the mating end and the mounting end.

The conductive elements may be held in groups by an insulative member and may be positioned in an edge-to-edge configuration. The insulative member may comprise multiple portions, including holding portions, each holding a group of conductive elements, and connecting portions connecting adjacent groups. A group may have one or more signal conductors and optionally may include one or more ground conductors. The holding portions may hold the signal conductors in each group to be separated from each other by desired distances, such as a distance specified by an industry standard. The connecting portions may hold the groups separated from each other by desired distances, such as a distance specified by the industry standard. In some embodiments, the holding portions may hold portions of the intermediate portions of the signal conductors of the group. The portions of the intermediate portions held by the holding portions may be along less than 50% of the lengths of the high-speed signal conductors, and in some embodiments, less than 40%, 30%, 20% or 10% of the lengths of the signal conductors. This configuration may reduce impedance variation along the lengths of the signal conductors. In some embodiments, the insulative member may be molded over at least a portion of each signal conductor, thereby holding the signal conductors together.

A shielding shell may be configured to provide multi-dimensional shielding for signal conductors in each of multiple groups. The shielding shell may provide shielding over at least a portion of the lengths of the signal conductors and may provide shielding substantially along the lengths of the signal conductors. The shielding shell may surround on four sides the intermediate portions of the signal conductors in each group and may extend from the mating ends to mounting ends of the signal conductors, with openings that expose contact surfaces at the mating and mounting ends. For example, a shielding shell may be formed by shaping one or more metal sheets into multiple tubular structures connected to each other, with a group of conductive elements extending through a hollow interior of a corresponding tubular structure. Each tubular structure may have conductive walls bounding the intermediate portions of the conductive elements in one group, on at least three sides. In some embodiments, each tubular structure may bound the intermediate portions of a corresponding group of conductive elements on four sides. At the ends, each tubular structure may also bound the mating and mounting ends of the corresponding group of conductive elements on at least three sides. In some embodiments, each tubular structure may bound the mating and mounting ends of the conductive elements in a corresponding group on four sides. On at least one side, the mating and mounting ends may be exposed through the shielding shell for mating to a complementary connector or mounting to a PCB.

The shielding shell may have contact members to mate with a complementary connector and/or for making connections to a PCB. The contact members may be integrally formed with the one or more sheets formed into the shielding shell or may be separately formed and electrically and/or mechanically connected to those one or more sheets. The shielding shell, for example, may have projections with mounting ends with mounting contact surfaces. The mounting ends of the shielding shell may be in line, in the row direction, with the mounting ends of the conductive elements and may have a shape similar to the shape of the mounting ends of the conductive elements. Such a configuration may enable the mounting ends of the shielding shell to be mounted to a PCB at the same time and using the same attachment technology as is used to mount the conductive elements. Both the conductive elements and the shielding shell, for example, may be mounted to a PCB using surface mount soldering. The mounting contact surfaces of the shielding shell may be coplanar with the mounting contact surfaces of the conductive elements, which facilitates mounting the connector on this another electrical component, such as through surface mount soldering.

The shielding shell alternatively or additionally may have contacts configured as mating ends. The mating ends may be integral with a sheet forming the shielding shell and may extend, for example, from a body portion of the shielding shell. These mating ends of the shielding shell may extend parallel to mating ends of conductive elements, and may extend in a direction perpendicular to the row direction. In this configuration, a mating end may be disposed between adjacent groups of conductive elements. Each mating contact end may have a mating contact surface, configured for mating with a complementary mating contact surface of another electrical component, such as a complementary connector.

The inventors have recognized and appreciated an efficient and repeatable process to manufacture a connector that includes shielding. Shielding and multiple groups of contacts may be formed into a subassembly, and one or more such subassemblies may be supported by a connector housing. In some embodiments, a subassembly may be manufactured from a first shell part having plateaus and valleys connected by sides. In some embodiments, the first shell part may be formed by stamping a metal sheet into a one-piece blank, which may be folded or otherwise formed into alternating plateaus and valleys connected by the sides. A plateau and an adjacent side may form two transverse walls of a tubular structure of the shielding. A plateau and two adjacent sides may form three side walls of a tubular structure of the shielding. The first shell part may be formed with multiple plateaus, each joined to two adjacent valleys through sides, enabling a metal sheet to be used in forming multiple tubular structures.

Other shell parts may be combined with the first shell part to provide further walls to the tubular structures. A second shell part, for example, may be secured to the valleys of the first shell part, providing walls on four sides of each of multiple tubular structures. The first shell part and the second shell part may be combined into one structure through, for example, welding or riveting or latching features. A plateau and two adjacent sides of the first shell part in combination with a portion of the second shell part may form walls on four sides of a tubular structure.

Assembly may be further facilitated through the use of a lead assembly with the conductive elements in all or part of a row in the connector. Conductive elements may be positioned in the tubular structures of the shielding shell by positioning a lead assembly between the first shell part and the second shell part before the first shell part is connected to the second shell part. The lead assembly may have multiple groups of conductive elements, with each of the groups aligned with one of the tubular structures. The lead assembly may have an insulative member, forming a lead frame housing, holding the conductive elements within each of the multiple groups in desired positions relative to each other and also holding the groups in desired positions relative to each other. A lead assembly may be formed by molding insulative material, forming the lead assembly housing, over conductive elements such that the conductive elements are held together in a row. The conductive elements within each lead assembly may be aligned in an edge-to-edge configuration. The lead assembly housing may include holding portions overmolded on each of the groups of conductive elements and connecting portions, joining the overmolded portions.

The conductive elements of a lead assembly may be positioned in the tubular structures with groups of conductive elements of the lead assembly aligned with plateaus of the first shell part. With this positioning, the lead frame and the shell may be aligned in the row direction.

In some embodiments, the connecting portions of the lead assembly housing may be aligned with the valleys. The valleys of the shell may have openings, which may be aligned in a line. Each opening may separate a respective valley into two portions. By aligning connecting portions of the lead assembly housing in the openings through the valleys of the first shell part, the first shell part may contact the second shell part with the lead assembly between them.

In this configuration, the lead assembly and the shell may also be aligned in a direction perpendicular to the row direction. Such a configuration may provide shielding for each group of conductive elements. The second shell part may also be formed by stamping a metal sheet into a one-piece blank, which may be folded or otherwise formed to create mounting ends and mating ends. The second shell part may be assembled to the first shell part, such as by attaching the second shell part to the first shell part at the valleys. When assembled, the second shell part may close the three-sided tubular structure provided by the first shell part, providing shielding on an additional side. In some embodiments, the first shell part may be attached to the second shell part by welding. Welding, for example, provides both desired high-speed performance and efficient manufacture.

By selection of which portions of the tubular structures are formed by each shell part, the tubular structures may have a shape to enclose conductive elements of any of multiple shapes. Openings in the tubular structures to expose the mating and mounting ends of conductive elements, for example, may face in transverse directions, such as orthogonal directions. Such a configuration may enable the tubular structures to encircle conductive elements used in a right angle connector or in a vertical connector in which the mating interface is parallel to the mounting interface.

In some embodiments, the row of conductive elements may include conductive elements configured for high-speed signals, low-speed signals, ground, power, or any other suitable purposes. In some embodiments, the row of conductive elements may be a first row of conductive elements. The electrical connector may include a second row of conductive elements. The high-speed and low-speed signal conductors, as well conductive elements configured for other purposes, may be distributed across the rows. One or more other rows of the connector may include shielding shells providing shielding around at least the high speed signal conductors of the other rows. Alternatively, the high-speed signal conductors may be only within a first row, for example, and only that row may include one or more shielding shells.

The rows of signal conductors may be held within a connector housing to mate with complementary signal conductors in a mating connector. All or a portion of a row of conductive elements may be inserted into an opening in the connector housing as part of a subassembly, such as the subassembly described above comprising a shielding shell and a lead assembly. The design techniques described herein may be embodied as a receptacle connector. In those embodiments, the first and second rows of conductive elements may be separated by a slot, which may be configured to receive a mating end of another electrical component, such as a printed circuit board or a plug connector. Alternatively or additionally, the design techniques described herein may be embodied as a plug connector. In those embodiments, the first and second rows of conductive elements may be held on opposite sides of a housing wall, which may be configured to insert into a slot of another electrical component, such as a card edge connector or a receptacle connector.

FIGS. 1A-1D are an example of techniques as described herein integrated into a plug connector. In this example, plug connector 100 may include a housing 102, which may include a base portion 114 that may elongate in a row direction, a front wall 108 extending from the base portion 114, and guide members 116 that may extend at opposite sides of the base portion 114. The guide members 116 may each include an opening 121 configured to receive a complementary guide member of a mating electrical component, and a slot 118 that may hold a fork lock 120. Fork lock 120 may be used to hold a mounting surface of the connector housing (shown in FIG. 1D) to a printed circuit board to which connector 100 is to be mounted.

The front wall 108 may include channels 110 shaped and disposed to receive respective conductive elements. The connector 100 may include a top row 104 of conductive elements and a bottom row 106 of conductive elements, separated from each other by the front wall 108 of the housing 102. As illustrated, the top row 104 of conductive elements may include conductive elements that may be shaped differently for various purposes including, for example, signal, ground, power, or any suitable purposes. Ground conductors, for example, may be longer than signal conductors. As another example, conductors designated for carrying power may be wider than those designated for carrying signal conductors. In this example, top row 104 contains only low-speed signal conductors. The top row 104 of conductors may be disposed along a first side of the front wall 108, which may have a platform 124 to distinguish a second side of the front wall 108 that may hold the bottom row 106. The bottom row 106 of conductive elements may also include conductive elements that may be shaped differently for various purposes including, for example, signal, ground, power, or any suitable purposes. Bottom row 106 contains groups of signal conductors configured for high-speed signals.

The connector 100 may include, in one or more rows, connector subassemblies configured to reduce crosstalk and enable high-speed transmission. In the illustrated example, the bottom row 106 of conductive elements and its associated shielding shell 122 form a subassembly 200. Each connector subassembly 200 may include one or more features to engage a connector housing 102 such that each subassembly 200 may be inserted and then retained in housing 102. In this example, each subassembly 200 may be retained within the housing by being sized and shaped to fit in the channel 110.

In the example illustrated in FIGS. 2A-4C, a connector subassembly 200 may include the shielding shell 122 and a lead frame assembly 306. The lead frame assembly 306 may include groups of signal conductors 362 that may have broadsides 328 joined by edges 326, and an insulative member 320 holding the groups of signal conductors 362. Each signal conductor 362 may include a mating end 312 comprising a mating contact surface 322, a mounting end 314 opposite the mating end 312 and comprising a mounting contact surface 324, and an intermediate portion 316 extending between the mating end 312 and the mounting end 314. In the illustrated example, the mating contact surface 322 of the mating end 312 is substantially parallel to the mounting contact surface 324 of the mounting end 314. Each signal conductor further includes a transition region 318 between the intermediate portion 316 and the mating end 312, such that the mating contact surface 322 of the mating end 312 and the broadside 328 of the intermediate portion 316 extend along two planes that are offset from each other in a direction perpendicular to the broadside 328.

The signal conductors 362 may be disposed in groups based on terminal assignments of a desired standard. In the illustrated example, the signal conductors 362 are disposed into three different kinds of groups 364A, 364B, and 364C. Each kind of groups may include different numbers of signal conductors 362. The insulative member 320 may comprise holding portions 324A and 324B that hold the signal conductors 362 in one group in an edge-to-edge configuration and separated from each other by a fixed center-to-center distance d1. The insulative member 320 may include connecting portions 310 that connect the adjacent holding portions 324A and separate the adjacent groups of signal conductors by a distance larger than d1. The holding portion 324A of the insulative member 320 may hold portions of the intermediate portions 316 of the signal conductors 362 in one group, and the holding portion 324B of the insulative member 320 may hold portions of the mating ends of the signal conductors 362 in one group. The mating end 312 of each signal conductor 362 may have a distal end embedded in the holding portion 324B of the insulative member 320. The portions of the intermediate portions 316 held by the insulative member 320 may be along less than 50% of the lengths of the signal conductors 362, and in some embodiments, less than 40%, 30%, 20% or 10% of the lengths of the signal conductors 362. This configuration may reduce impedance variation along the lengths of the signal conductors 362.

The shielding shell 122 may be configured with tubular structures 366 that each provides multi-dimensional shielding for one group of signal conductors 362 and mating ends, here shown as contact bars 334, enabling the connector 100 to be compatible to physical requirements of corresponding industrial standards. Such a configuration enables high-speed transmission, without the need to redesign mating electrical components such as the peripherals that may be designed and manufactured by different companies according to a standard that specifies locations of the mating and mounting contact surfaces. As illustrated, the shielding shell 122 may extend from the mating ends 312 to the mounting ends 314 of the signal conductors 362. The shielding shell 122 may have a front piece 336 disposed beyond the mating ends 312 of the signal conductors 362. The shielding shell 122 may have opening 204 that each exposes the mating contact surfaces 322 of the signal conductors 362 in one group, and opening 206 that exposes the mounting contact surfaces 324 of the signal conductors 362 in one group. In this example, the mating contact surfaces are exposed through openings in the shielding shell 122 that open in a direction perpendicular to the elongated dimension of the signal conductors 362.

A shielding shell may include one or more parts. In the illustrated example, the shielding shell 122 includes a first shell part 302 and a shield 304 configured to be attached to the first shell part 302 to form the tubular structures 366 each substantially surrounding the signal conductors 362 in one group. In this example, mating and mounting contact surfaces 342 and 344 of the shielding shell are integrally formed with the second shell part 304. The second shell part 304 may include a body portion 332 and mounting members 338 extending from the body portion 332. The mounting members 338 may include the mounting contact surfaces 344. The mounting contact surfaces 344 may be disposed in a same plane with the mounting contact surfaces 324 of the signal conductors 362, such that the connector subassembly 200 can be mounted onto another electrical component such as a printed circuit board.

The pads on the printed circuit board may be positioned according to a predefined standard. For example, the pads in a row, such as pads for mounting high-speed signal conductors and their associated ground conductors may be on a uniform pitch. Disposing the mounting members 338 between adjacent groups of signal conductors 362 enables the techniques as described herein to be mounted on a PCB manufactured according to a standard for which pads for high-speed signal pairs are separated by a ground pad. Nonetheless, the tubular structures 366 around the groups provided by the shielding shell 122 are grounded on both sides of the respective groups, which enables the connector to carry high-speed signals.

Accordingly, within a region of a connector with high-speed signal conductors in a row, the mounting contact surfaces 344 of the mounting members 338 and the mounting contact surface 324 of the signal conductors 362 may be on a uniform center-to-center pitch. For example, the center-to-center pitch may be 0.80 mm in some embodiments. Moreover, the pads span a distance, in the row direction, that is a fraction of the center-to-center pitch. For example, the pads may have a width of 0.5 mm.

The second shell part 304 may include the contact bars 334 extending from the body portion 332 and opposite to the mounting members 338. Each contact bar 334 may correspond to one of the mounting members 338. The contact bars 334 may each have a mating contact surface 342. The openings 204 for exposing the mating contact surfaces 322 of the groups of signal conductors 362 may be formed between adjacent contact bars 340. The openings 204 and the contact bars 334 may be sized and disposed to control a center-to-center distance d2 between the contact bar 334 and an adjacent mating end 312. In some embodiments, the center-to-center distance d2 between the contact bar 340 and an adjacent mating end 312 may be configured to be the same as the center-to-center distance d1 between the mating ends 312 of the signal conductors 362 in one group. Such a design enables the control of the distances d1 and d2 according to the applicable industrial standards. In the illustrated example, the contact bars 334 are connected by the front piece 336, which may extend perpendicular to the broadsides 328 of the signal conductors 362.

The first shell part 302 may include channels 360 each belonging to one of the tubular structures 366 of the shielding shell 122 and valleys 404 connecting adjacent channels 360. Each channel 360 may include a plateau 402 and two sides 406 and configured to receive the signal conductors 362 of one group.

Figure 4A:
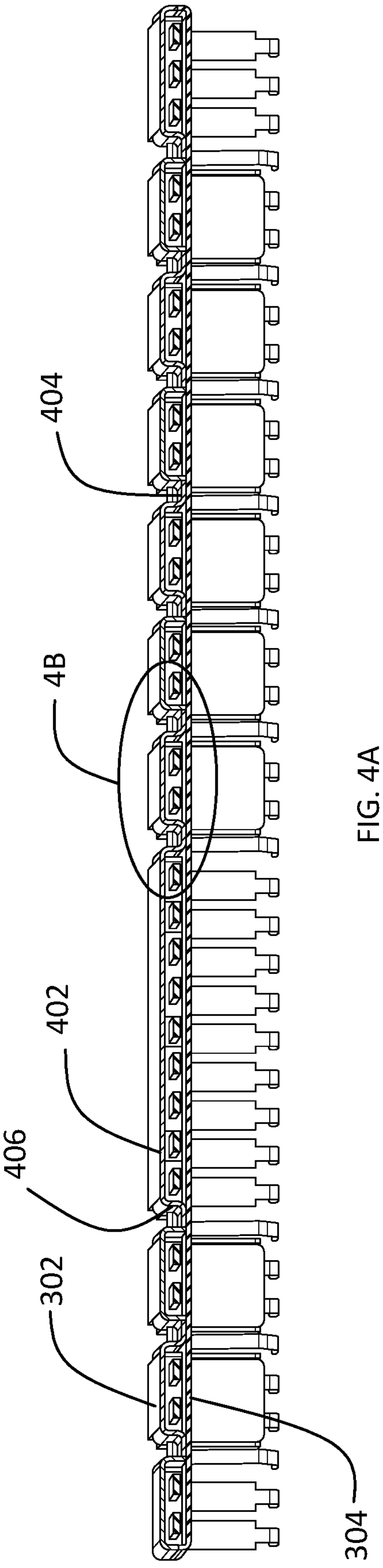
FIG. 4A is a cross-sectional perspective view of the connector subassembly of FIG. 2A along the line marked "4A-4A" in FIG. 2A.
Figure 4B:
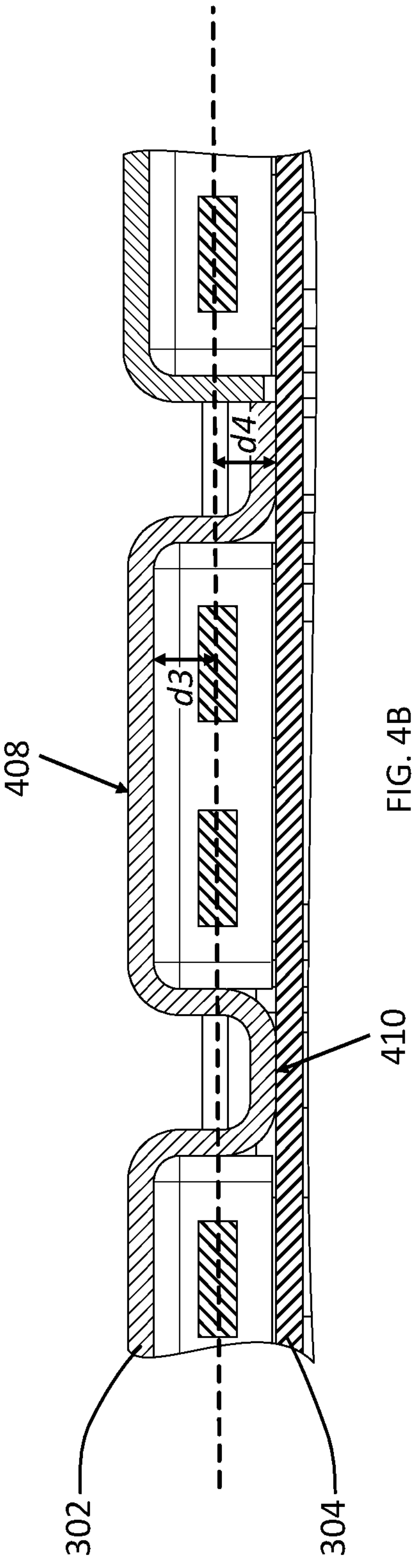
FIG. 4B is an enlarged view of a portion of the connector subassembly of FIG. 4A in a circle marked "4B" in FIG. 4A.

A desired shielding profile for each group of signal conductors 362 may be provided by disposing the intermediate portions 316 of the signal conductors 362 in each group in the center of the hollow interiors of the respective tubular structures 366. As shown in FIG. 4B, the first shell part 302 extends from a first surface 408 to a second surface 410. For each tubular structure 366, a center line of the signal conductors 362 in the group surrounded by the tubular structure is spaced from the second surface 410 of the plateau 402 by a distance d3 and from the first surface 408 of the valley 404 by a distance d4. The distances d3 and d4 may be configured to be equal. Each side 406 may extend perpendicular to the center line along at least 50% of its length.

Figure 4C:
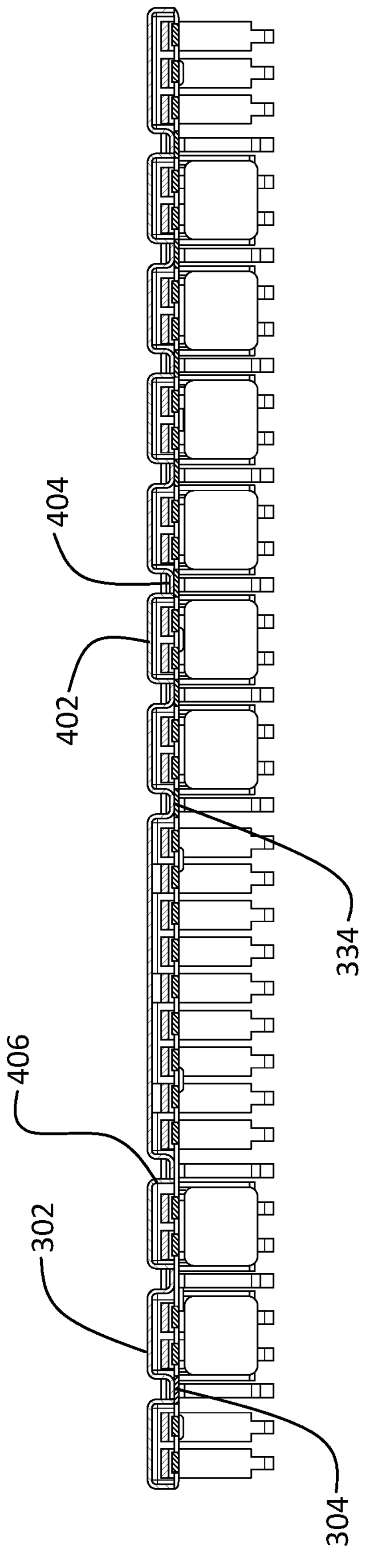
FIG. 4C is a cross-sectional perspective view of the connector subassembly of FIG. 2A along the line marked "4C-4C" in FIG. 2A.

The second shell part 304 may be attached to the first shell part 302 at the valleys 404 to close the one side left open by the channels 360 and provide shielding on this side. As shown in FIG. 4C, the contact bars 334 of the second shell part 304 may be attached to the valleys 404 such that the mating ends 312 of the signal conductors 362 can be exposed by the openings 204 between contact bars 334. Through the transition regions 318, the mating contact surfaces 322 of the signal conductors 362 are disposed on a same plane of the mating contact surfaces 342 of the contact bars 334 of the second shell part 304.

The multi-dimensional shielding provided by the shielding shell 122 may extend to the mounting ends 314 of the signal conductors in one or more groups, which may be configured for very high-speed signals. In the illustrated example, such shielding is extended to the mounting ends 314 of the signal conductors 263 in the groups 364B. The first shell part 302 may provide three sides of the multi-dimensional shielding at the mounting ends by the extensions 356 extending from respective plateaus 402. As illustrated, each extension 356 may include a pair of flaps 357. Each flap 357 may be aligned with a respective side and/or valley adjacent the plateau from which the extension extends from. Forming the flaps 357 as part of the same piece as the valleys 404 and the sides 406 may enable substantially shielding the signal conductors over substantially all of their length. The second shell part 304 may provide shielding on a fourth side at the mounting ends by the rear portions 330 extending from the body portion 332.

Figure 3A:
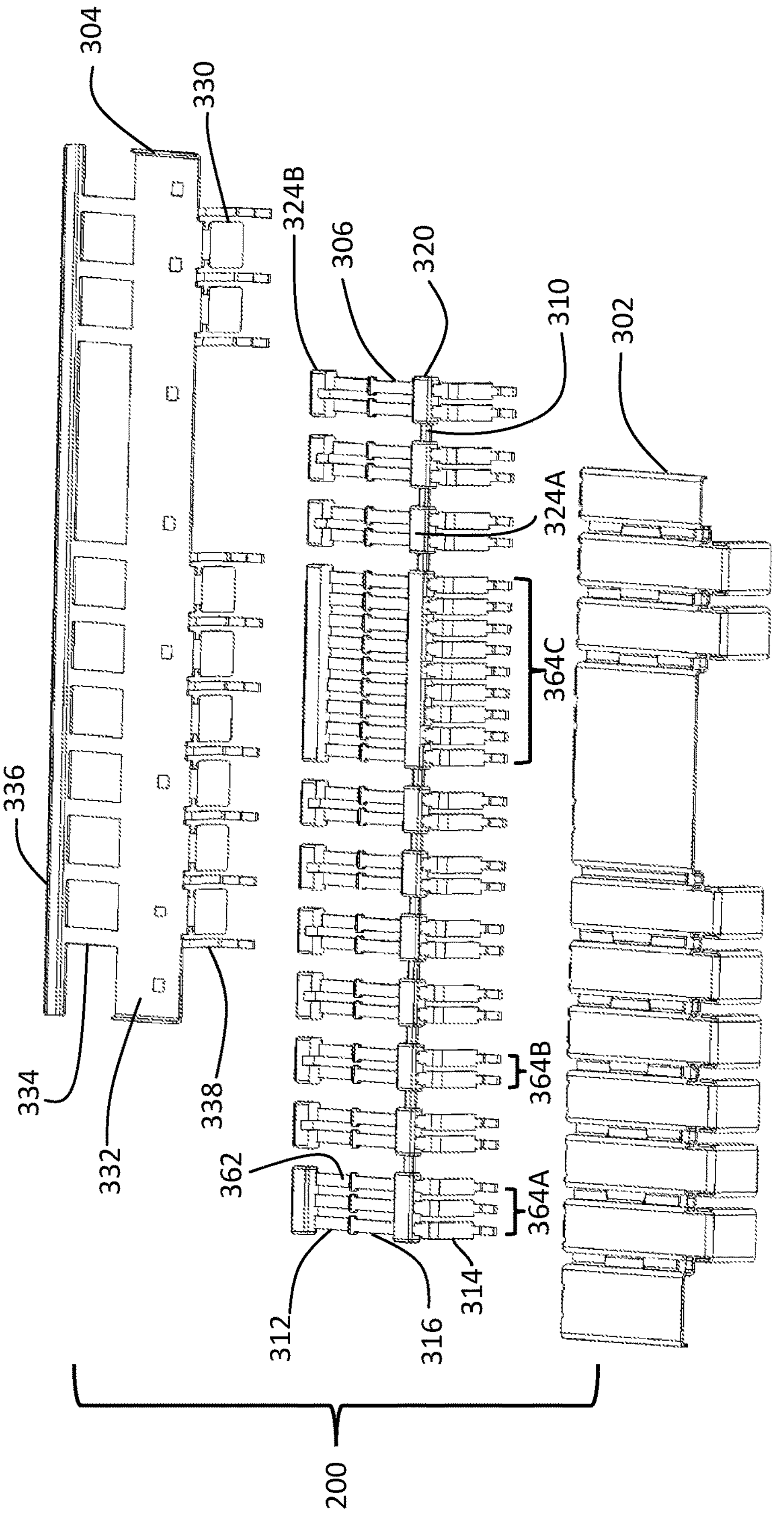
FIG. 3A is a top, rear partially exploded view of the connector subassembly of FIG. 2A.
Figure 3B:
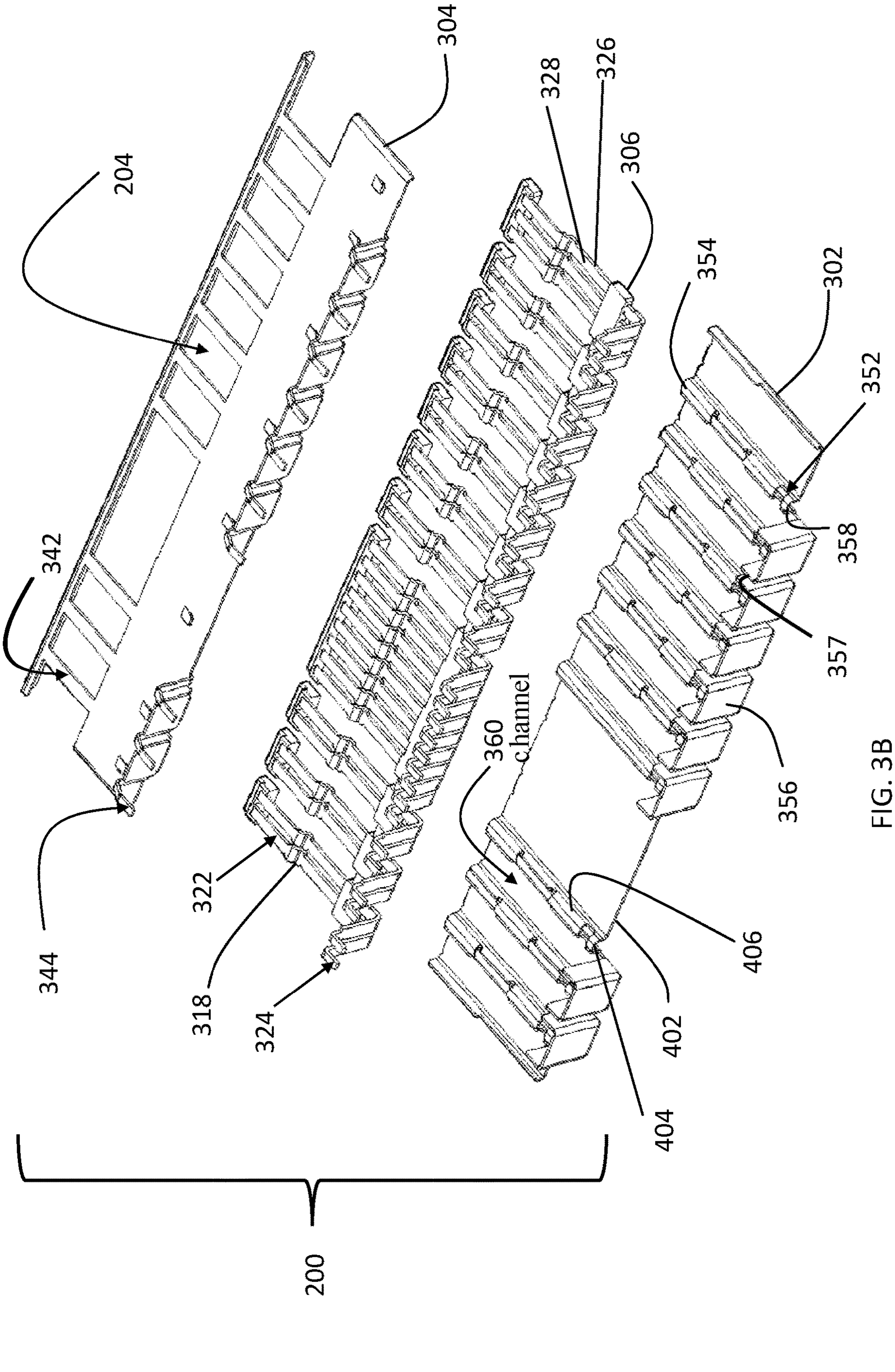
FIG. 3B is a bottom, rear partially exploded view of the connector subassembly of FIG. 2A.

As discussed above, the second shell part 304 may be formed by stamping a metal sheet into a one-piece blank. The one-piece blank may be formed, such as by folding, into the shape illustrated in FIGS. 3A and 3B. The first shell part 302 may be formed by stamping a metal sheet into a one-piece blank, which may be folded into the shape illustrated in FIGS. 3A and 3B; or by stamping one or more metal sheets into multiple subparts (e.g., subparts 202A and 202B shown in FIG. 2A), each of which may be folded to have at least one plateau and at least a portion of a valley. The multiple subparts then may be combined into one structure through, for example, matching features 208. As shown in FIG. 3B, the valleys 404 of the first shell part 302 may have openings 352 extending therethrough and aligned in a line. Each opening 352 may separate a respective valley 404 into two portions 354 and 358. The lead frame 306 may be inserted into the first shell part 302 by aligning and placing the connecting portions 310 of the insulative member 320 to the line of openings 352.

Techniques as described herein may also be embodied as receptacle connectors. Receptacle connector 500 here is shown in a configuration that it may mate with a plug connector 100. Accordingly, while the mating contact portions of the conductive elements of connector 100 were blade like, the mating contact portions of connector 500 have a complementary configuration, here illustrated as beams that deflect upon mating to generate a contact force.

Figure 5A:
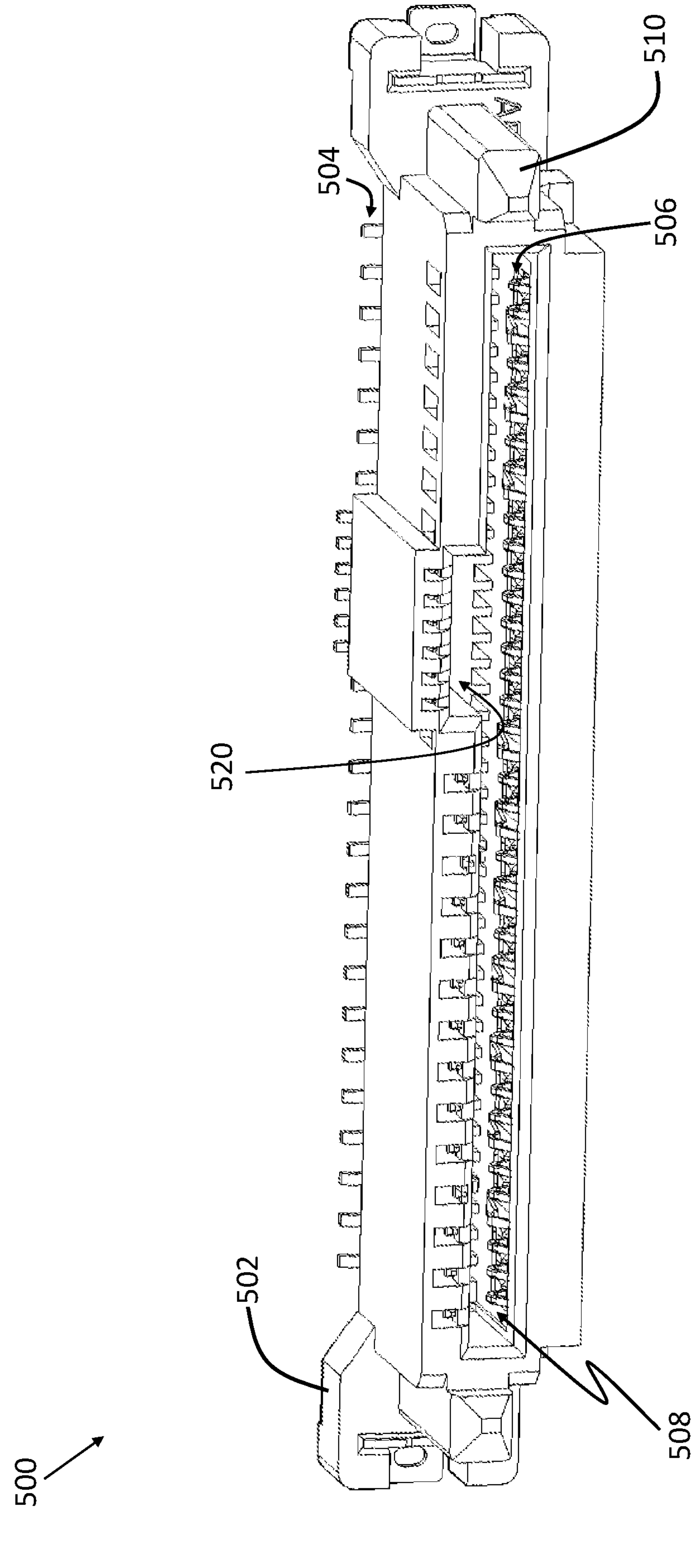
FIG. 5A is a front perspective view of a receptacle connector, showing a mating interface, according to some embodiments.
Figure 5B:
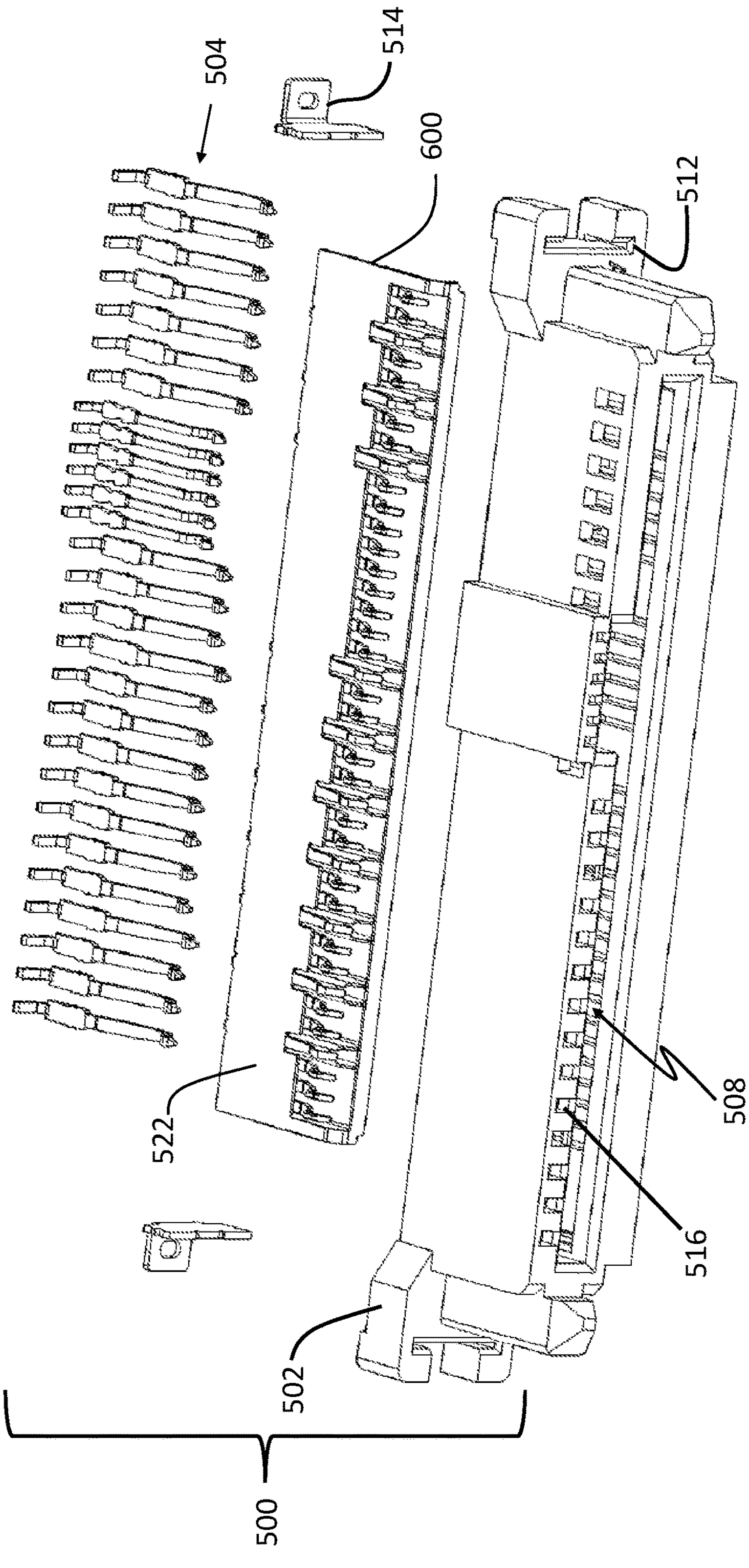
FIG. 5B is a partially exploded front, side perspective view of the receptacle connector of FIG. 5A.
Figure 6A:
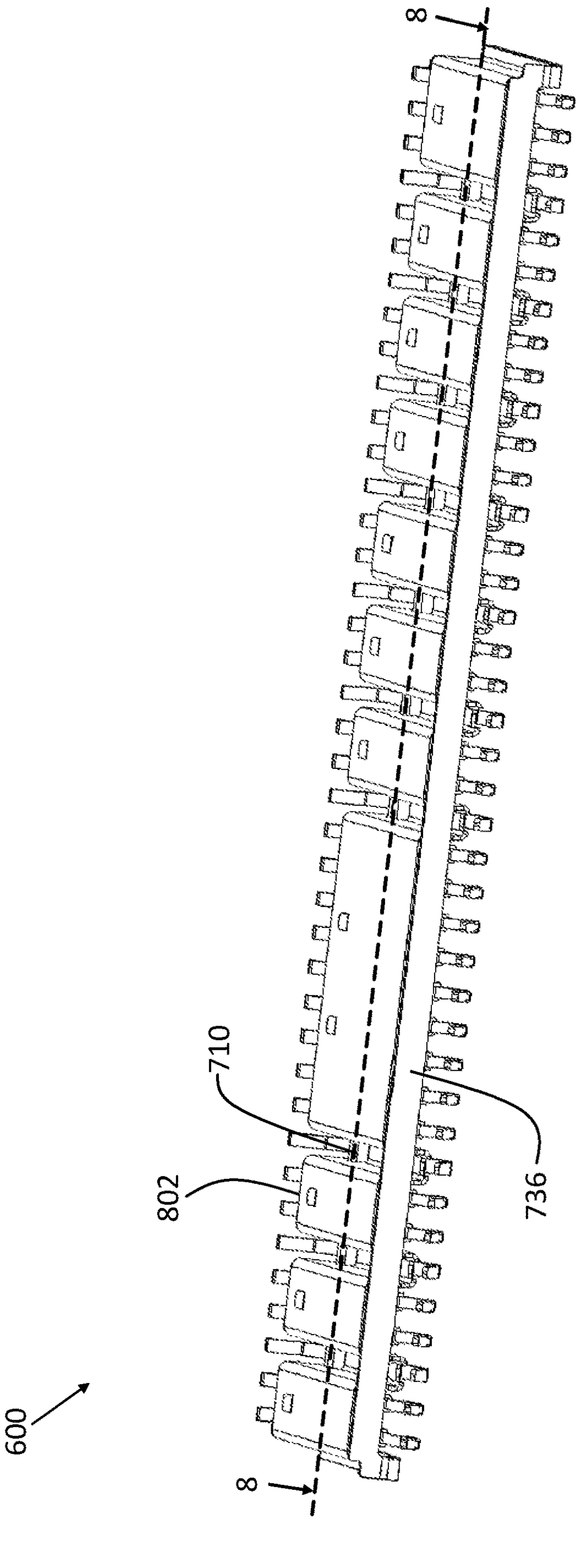
FIG. 6A is a front, side perspective view of a connector subassembly of the receptacle connector of FIG. 5A.
Figure 6B:
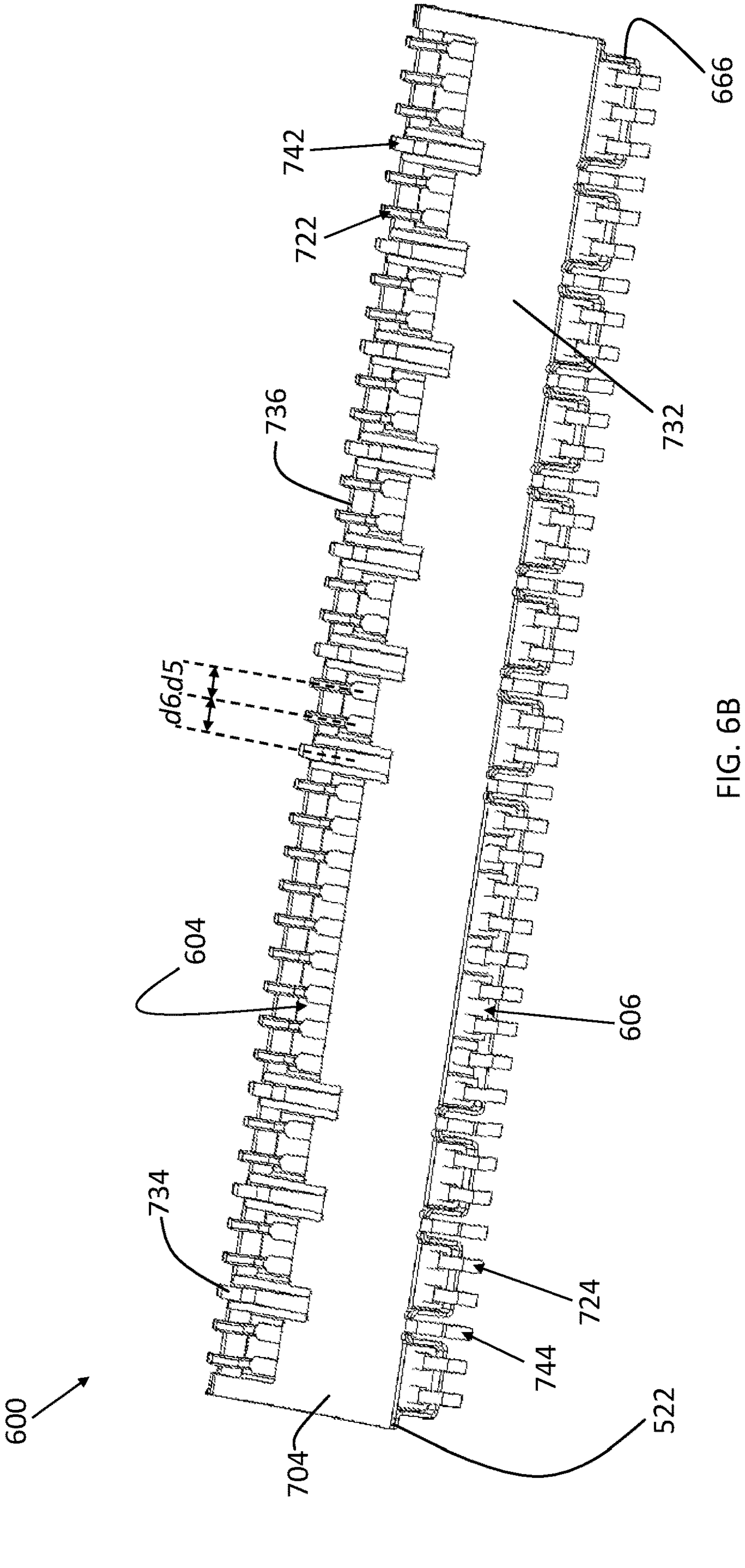
FIG. 6B is rear, side perspective view of the connector subassembly of FIG. 6A.
Figure 7A:
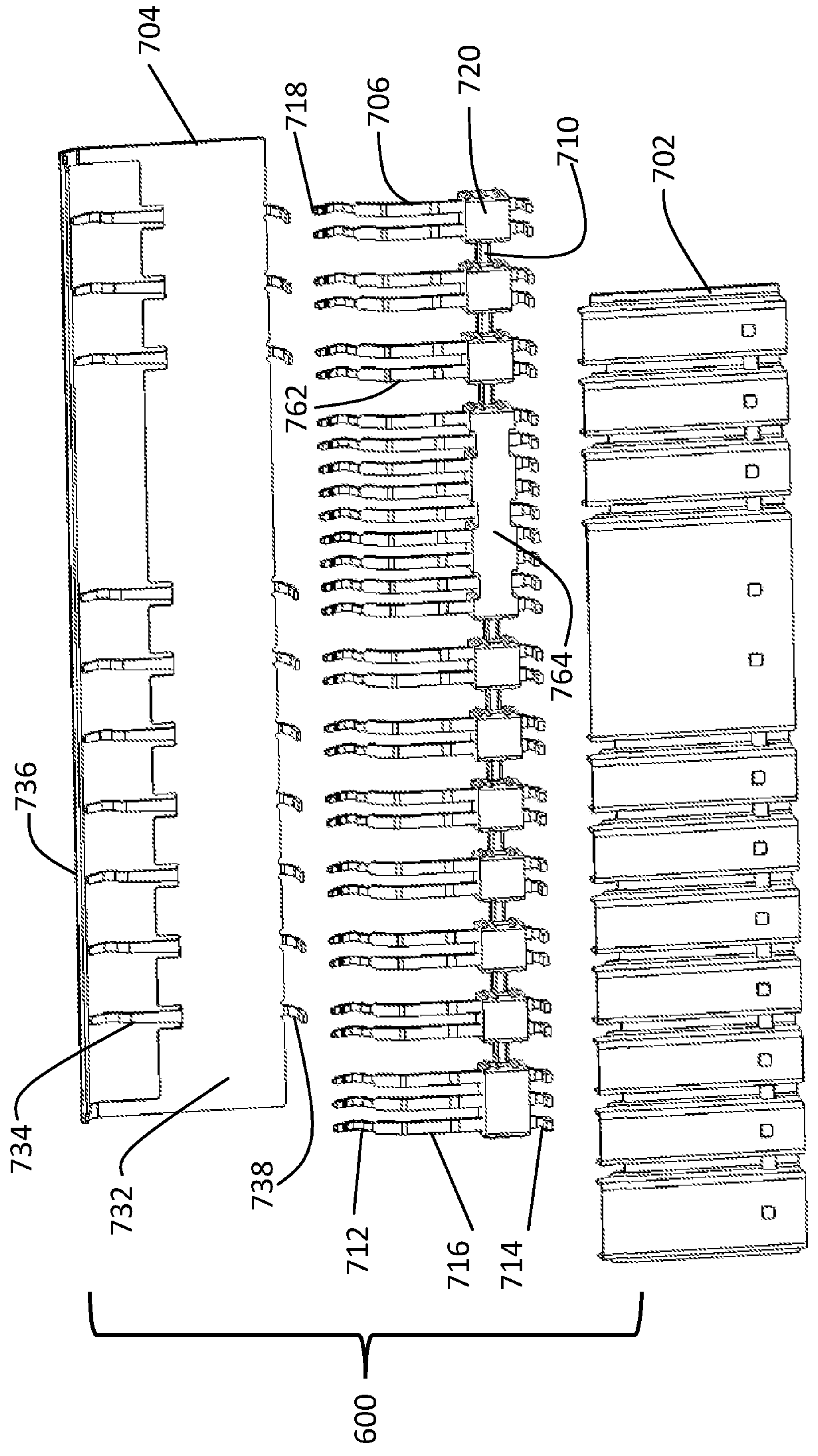
FIG. 7A is a partially exploded first side perspective view of the connector subassembly of FIG. 6A.
Figure 7B:
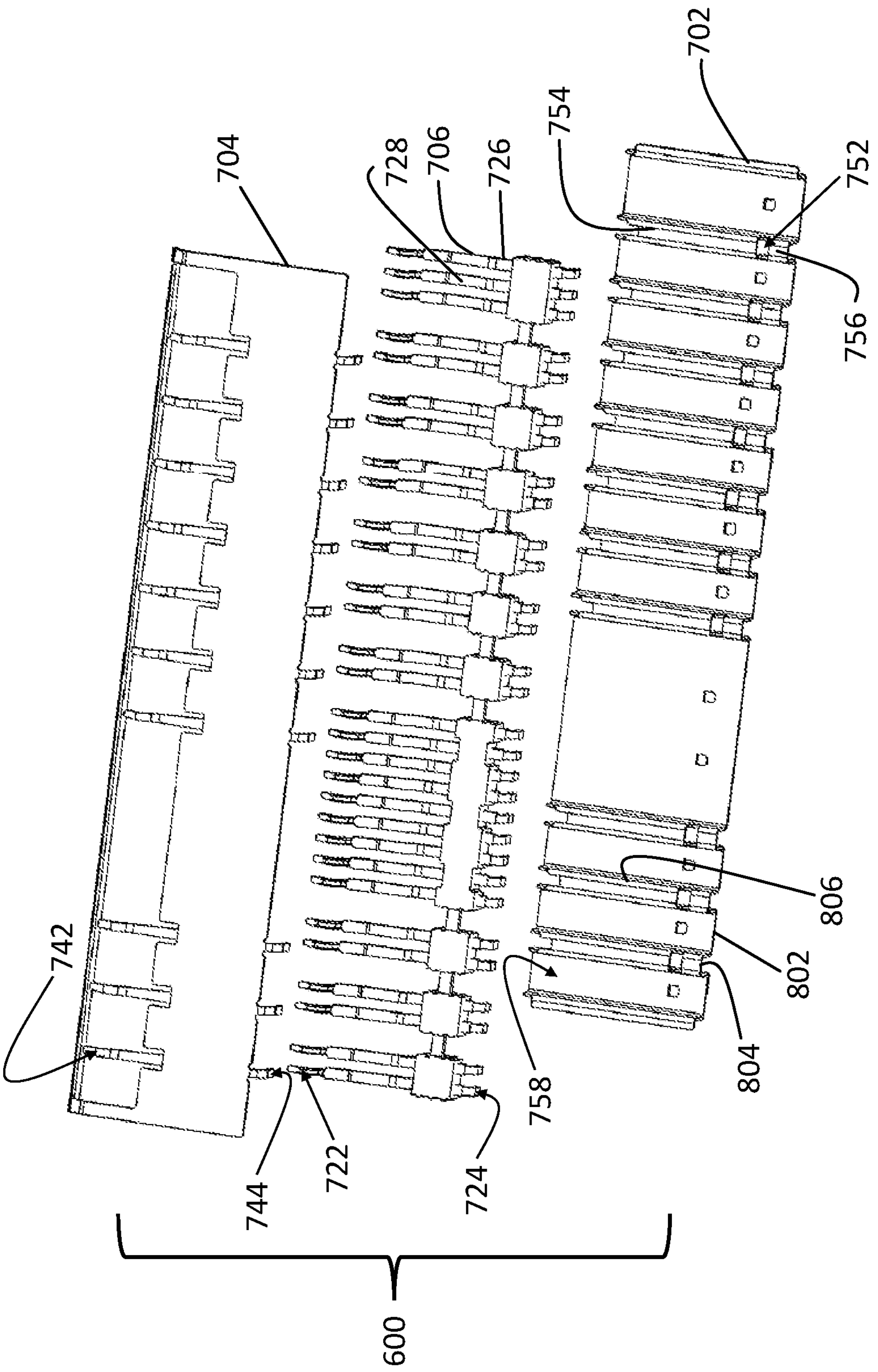
FIG. 7B is a partially exploded second side perspective view of the connector subassembly of FIG. 6A.

As shown in FIGS. 5A-5B, a receptacle connector 500 may include a housing 502, which may have a slot 508, elongated in a row direction. Housing 502 may also include guide members 510 that may extend at opposite sides of the slots 508. The guide members 510 may be configured to engage complementary guide members of another electrical component (e.g., the openings 122 of the guide members 116 of the plug connector 100). The housing 502 may also include slots 512 on opposite sides with locking member 514 inserted in the slots 512. Locking members 514 may be configured to enhance the attachment between the receptacle connector 500 and another electrical component that the receptacle connector 500 is mounted to, such as a printed circuit board. The housing 502 may include channels 516 shaped and disposed to receive respective conductive elements.

The connector 500 may include a top row 504 of conductive elements and a bottom row 506 of conductive elements, separated from each other by the slot 508 of the housing 502. As illustrated, the top row 504 of conductive elements may include conductive elements that may be shaped differently for various purposes including, for example, signal, ground, power, or any suitable purposes. The bottom row 506 of conductive elements may also include conductive elements that may be shaped differently for various purposes including, for example, low-speed signal, ground, power, or any suitable purposes.

The connector 500 may include, in one or more rows, connector subassemblies 600 configured to reduce crosstalk and enable high-speed transmissions. The subassemblies may be retained in the housing by being sized and shaped to fit in a corresponding channel of the housing. In the illustrated example, the bottom row 506 of conductive elements and an associated shielding shell 522 form a connector subassembly 600. As with the example of connector 100, the bottom row 506 of signal conductors may be disposed in groups. Also as with the example of connector 100, the shielding shell 522 includes a first shell part and a second shell part attached to the first shell part.

As illustrated in FIGS. 6A-8, a connector subassembly 600 may include the shielding shell 522 and a lead frame assembly 706. The lead frame assembly 706 may include groups of signal conductors 762 that may have broadsides 728 joined by edges 726, and an insulative member 720 holding the signal conductors 762. Signal conductors 762 may each include a mating end 712 comprising a mating contact surface 722, a mounting end 714 opposite the mating end 712 and comprising a mounting contact surface 724, and an intermediate portion 716 extending between the mating end 712 and the mounting end 714. The mounting ends 712 may curve into the slot 508 of the housing 502. The mating contact surface 722 may be substantially perpendicular to the mounting contact surface 724.

The insulative member 720 may comprise portions 764 that hold the signal conductors 762 in an edge-to-edge configuration and separated from each other by a fixed center-to-center distance d5. The insulative member 720 may include portions 710 that connect the adjacent portions 764 and separate the adjacent groups of signal conductors 762 by a distance larger than d5. The insulative member 720 may hold portions of the intermediate portions 716 of the signal conductors 762. The portions of the intermediate portions 716 held by the housing member may be along less than 50% of the lengths of the signal conductors 762, and in some embodiments, less than 40%, 30%, 20% or 10% of the lengths of the signal conductors 762. This configuration may reduce impedance imbalance along the lengths of the signal conductors 762.

The shielding shell 522 may be configured with tubular structures 666 that each provides multi-dimensional shielding for one group of signal conductors 762, while enabling the connector 500 to be compatible to physical requirements of corresponding industrial standards. As illustrated, the shielding shell 522 may extend from the mating ends 712 to the mounting ends 714 of the signal conductors 762. The shielding shell 522 may include opening 604 that exposes the mating ends 711 of the signal conductors 762, and opening 606 that each exposes the mounting ends 714 of the signal conductors 762 in one group. The shielding shell 522 may have a front piece 736 disposed beyond distal ends 718 of the mating ends 712 of the signal conductors 762. The tubular structures 666 may each surround the intermediate portions 716 of the signal conductors 762 in one group.

As with the example of the connector 100, the shielding shell 522 may include a first shell part 702 and a second shell part 704. The second shell part 704 may include a body portion 732, mating ends 734 extending from the body portion 732 and comprising mating contact surfaces 742, and mounting members 738 extending from the body portion 732 and comprising mounting contact surfaces 744. The mating ends 734 may be disposed to control a center-to-center distance d6 between the mating end 734 and an adjacent mating end 712. In some embodiments, the center-to-center distance d6 between the mating end 734 and an adjacent mating end 712 may be configured to be the same as the center-to-center distance d5 between the mating ends 712 of the signal conductors 306 in one group. Such a design enables the control of the distances d5 and d6 according to the applicable industrial standards. The mounting contact surfaces 744 of the shielding shell 522 may be disposed in a same plane with the mounting contact surfaces 724 of the signal conductors 762, such that the connector subassembly 600 can be mounted onto another electrical component such as a printed circuit board. The mounting contact surfaces 744 may also align, in the row direction, with the mounting contact surfaces 724 of the signal conductors 762.

Figure 8:
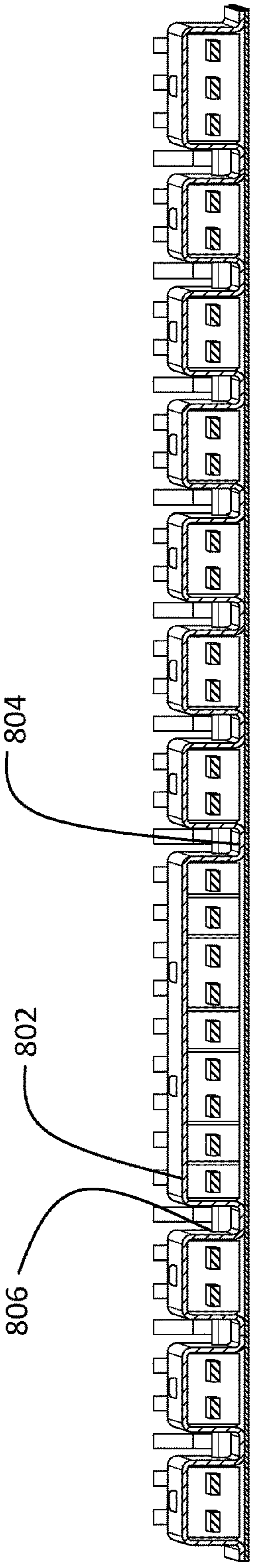
FIG. 8 is a cross-sectional perspective view of the connector subassembly of FIG. 6A along the line marked "8-8" in FIG. 6A.

The first shell part 702 may include channels 758 each belonging to one of the tubular structures 666 of the shielding shell 522 and valleys 804 connecting adjacent channels 758. Each channel 758 may include a plateau 802 and two sides 806 and configured to receive the signal conductors 762 of one group. As with the example of the first shell part 302 of the connector 100, a desired shielding profile for each group of signal conductors 762 may be provided by disposing the intermediate portions 716 of the signal conductors 762 in each group in the center of the hollow interiors of the respective tubular structures 666. The second shell part 704 may be attached to the first shell part 702 at the valleys 804 to close the one side left open by the channels 758 and provide shielding on this side. An example is illustrated in FIG. 8.

In some embodiments, housing components, such as the housing 102 and insulative members 320 and 720, may be dielectric members molded from a dielectric material such as plastic or nylon. Examples of suitable materials include, but are not limited to, liquid crystal polymer (LCP), polyphenyline sulfide (PPS), high temperature nylon or polyphenylenoxide (PPO) or polypropylene (PP). Other suitable materials may be employed, as aspects of the present disclosure are not limited in this regard.

In some embodiments, conductive elements such as signal conductors 362, 762 may be made of metal or any other material that is conductive and provides suitable mechanical properties for conductive elements in an electrical connector. Phosphor-bronze, beryllium copper and other copper alloys are non-limiting examples of materials that may be used. The conductive elements may be formed from such materials in any suitable way, including by stamping and/or forming.

Connector construction techniques as described herein may be used to increase performance of an electrical connector, particularly a miniaturized connector in which space is constrained by a standard such as SFF-8639. The structures described herein that lead to repeatable manufacture of connectors in mass production may also impact the performance of the connector. Repeatable manufacture, for example, results in connectors that in practice exhibit little variation in impedance or other electrical properties. Limiting such variations in turn enhances the integrity of signals passing through the connector, which may be seen for example by low crosstalk for the range or ranges of frequencies of interest.

Figure 9A:
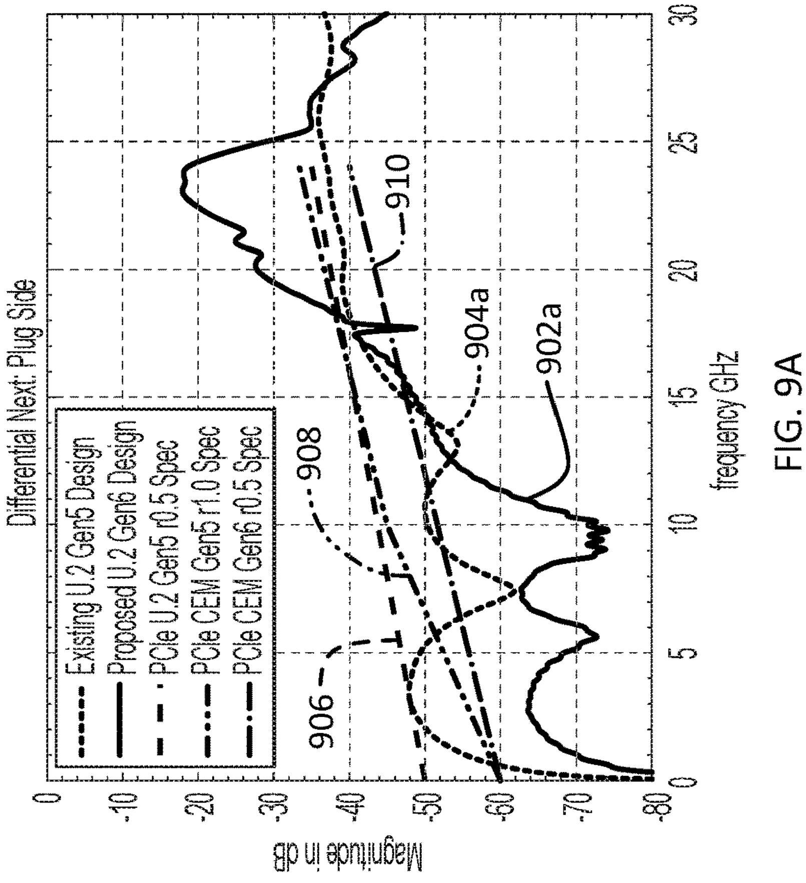
FIG. 9A is a performance plot showing the near end crosstalk (NEXT) of the plug connector of FIG. 1A as a function of frequency.
Figure 9B:
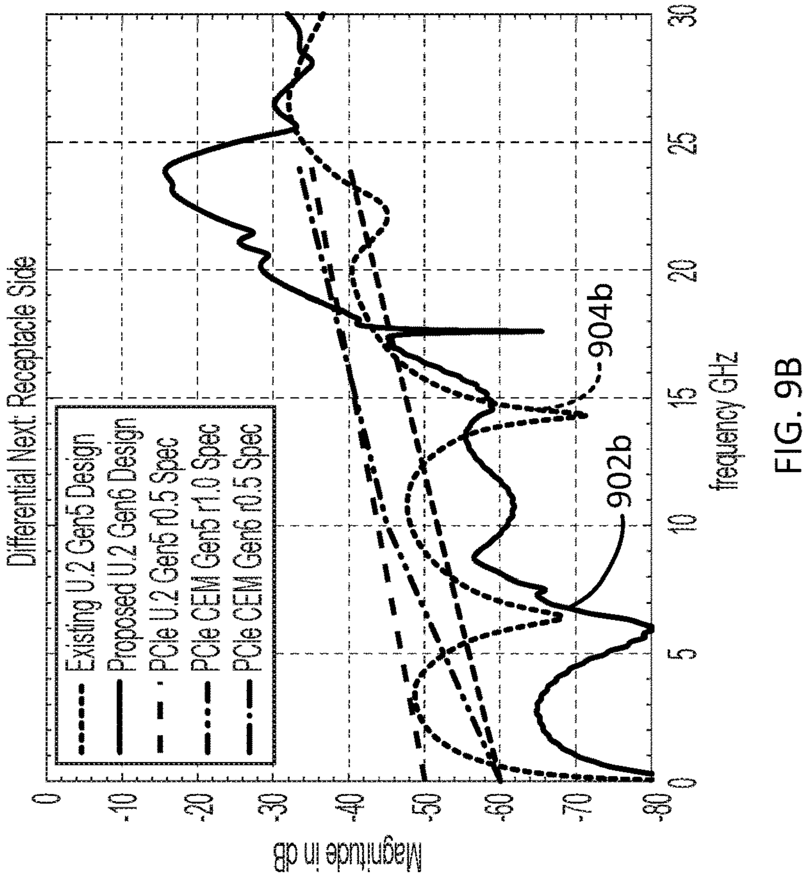
FIG. 9B is a performance plot showing the NEXT of the receptacle connector of FIG. 5A as a function of frequency.

FIG. 9A and FIG. 9B illustrate the near end crosstalk (NEXT) as a function of frequency for the plug connector 100 and the receptacle connector 500, respectively, compared with prior designs and industry standards. As illustrated, in the range of 0-15 GHz, curve 902*a* for the plug connector 100 and curve 902*b* for the receptacle connector 500 are below the requirements by the industry standards shown as curves 906, 908 and 910, while curve 904*a* for a prior plug connector and curve 904*b* for a prior receptacle connector are crossing the curves 906, 908 and 910. This shows that connector construction techniques as described herein enable the connectors to satisfy the industry standards.

Although details of specific configurations of conductive elements and housings are described above, it should be appreciated that such details are provided solely for purposes of illustration, as the concepts disclosed herein are capable of other manners of implementation. In that respect, various connector designs described herein may be used in any suitable combination, as aspects of the present disclosure are not limited to the particular combinations shown in the drawings.

Having thus described several embodiments, it is to be appreciated various alterations, modifications, and improvements may readily occur to those skilled in the art.

For example, techniques as described herein may be embodied in card edge connectors or connectors configured only for high-speed signals.

As another example, high-speed and low-speed signal conductors may be configured the same, with signal conductors in the same row having the same shape. The high-speed and low-speed signal conductors nonetheless may be differentiated based on the ground structures and insulative portions around them. Alternatively, some or all of the high-speed signal conductors may be configured differently from low-speed signal conductors, even within the same row. The edge-to-edge spacing may be closer for high-speed signal conductors, for example.

Embodiments were illustrated in which the shielding shell includes a first shell part and a second shell part attached to the first shell part. The second shell part may have mounting contact portions. In other examples, however, the first shell part may include mounting contact portions.

As another example, connectors are illustrated that have mating locations and mounting locations that may be compatible with a PCIeSAS standard. Techniques as described herein may be used to increase the operating speed of connectors designed according to other standards.

As yet another example, a plug connector was illustrated with mating contact portions of a first configuration and a receptacle connector was illustrated with mating contact portions with a second, complementary structures. A plug connector and receptacle connector may, in other examples, have the configurations of the mating contact portions reversed, or mixed.

Also, exemplary connectors were illustrated in which an entire row was formed as a subassembly with a shielding shell and a lead assembly. Other examples may have multiple subassemblies per row.

As yet another example, exemplary connectors were illustrated in which each subassembly was formed with a first shell part and a second shell part. Other number of shell parts may be used in other examples. For example, a single first shell part may be used on one side of a subassembly, but multiple second shell parts may be attached to that first shell part. Each of the multiple second shell parts may complete one or more of the tubular structures of the subassembly.

Such alterations, modifications, and improvements are intended to be within the spirit and scope of the invention. Accordingly, the foregoing description and drawings are by way of example only.

Furthermore, techniques for increasing the operating speed of a connector, even when constrained by dimensions specified in an industry standard, are shown and described with reference to a plug connector having a parallel board configuration, and a receptacle connector, it should be appreciated that aspects of the present disclosure are not limited in this regard, as any of the inventive concepts, whether alone or in combination with one or more other inventive concepts, may be used in other types of electrical connectors, such as card edge connectors, backplane connectors, right angle connectors, stacking connectors, mezzanine connectors, I/O connectors, chip sockets, etc.

In some embodiments, mounting ends were illustrated as surface mount elements that are designed to fit within pads of printed circuit boards. However, other configurations may also be used, such as press fit "eye of the needle" compliant sections, spring contacts, solderable pins, etc.

All definitions, as defined and used, should be understood to control over dictionary definitions, definitions in documents incorporated by reference, and/or ordinary meanings of the defined terms.

Numerical values and ranges may be described in the specification and claims as approximate or exact values or ranges. For example, in some cases the terms "about," "approximately," and "substantially" may be used in reference to a value. Such references are intended to encompass the referenced value as well as plus and minus reasonable variations of the value.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A connector subassembly, comprising:

an insulative member;

a plurality of conductive elements held by the insulative member in a row and disposed in a plurality of groups of conductive elements, each of the conductive elements comprising a mating end, a mounting end opposite the mating end, and an intermediate portion joining the mating end and the mounting end; and a shielding shell comprising a plurality of first openings and a plurality of second openings, wherein:

the intermediate portions of the plurality of conductive elements are disposed within the shielding shell such that the mating ends of the conductive elements in each group of the plurality of groups are exposed through an opening of the plurality of first openings and the mounting ends of the conductive elements in each group of the plurality of groups are exposed through an opening of the plurality of second openings.

2. The connector subassembly of claim 1, wherein:

the plurality of groups are spaced apart from each other in the row.

3. The connector subassembly of claim 1, wherein:

the shielding shell comprises a plurality of tubular structures, and each of the plurality of groups of conductive elements is disposed within a respective tubular structure.

4. The connector subassembly of claim 1, wherein:

the shielding shell comprises a first shell part comprising a plurality of plateaus and valleys integrally formed in the first shell part, and each of the plurality of groups of conductive elements is disposed adjacent a respective plateau of the plurality of plateaus.

5. The connector subassembly of claim 1, wherein the insulative member comprises:

a plurality of holding portions, each of the plurality of holding portions holding a respective group of the plurality of groups of conductive elements; and a plurality of connecting portions, integral with the plurality of holding portions, each of the plurality of connecting portions connecting adjacent holding portions of the plurality of holding portions.

6. The connector subassembly of claim 1, wherein:

the shielding shell comprises a plurality of mating ends and a plurality of mounting ends opposite to respective ones of the plurality of mating ends, and each of the plurality of mating ends of the shielding shell is disposed between adjacent groups of conductive elements.

7. The connector subassembly of claim 6, wherein:

for the plurality of conductive elements, the mating ends comprise mating contact surfaces disposed on a first plane, and the mounting ends comprise mounting contact surfaces disposed on a second plane, and for the shielding shell, the plurality of mating ends comprise mating contact surfaces disposed on the first plane, and the plurality of mounting ends comprise mounting contact surfaces disposed on the second plane.

8. An electrical connector, comprising:

a housing comprising a base portion and a wall extending from the base portion and having a first side and a second side; and the connector subassembly of claim 1, the connector subassembly disposed on the first side of the wall, wherein:

the wall of the housing comprises a platform on the second side; and the electrical connector further comprises a plurality of conductive elements disposed on the second side of the wall.

9. An electrical connector, comprising:

a housing comprising a slot with a first side and a second side; and the connector subassembly of claim 1, the connector subassembly disposed within the housing with the mating ends of the connector subassembly lining the first side of the slot, wherein:

the slot of the housing comprises a recess on the second side; and the electrical connector further comprises a plurality of conductive elements comprising mating ends lining the second side of the slot.

10. A connector subassembly, comprising:

an insulative member;

a plurality of conductive elements held by the insulative member in a row and disposed in a plurality of groups of conductive elements, the plurality of conductive elements each comprising a mating end comprising a distal end, a mounting end opposite the mating end, and an intermediate portion joining the mating end and the mounting end; and a shell part comprising plateaus and valleys, wherein:

the valleys are disposed between adjacent groups of the plurality of groups of conductive elements, and the plateaus are spaced from the plurality of groups of conductive elements and extend at least from the distal ends of the mating ends of the plurality of conductive elements to the insulative member.

11. The connector subassembly of claim 10, wherein:

the shell part extends from a first surface to a second surface, the first surface of the plateaus are spaced from the row by a first distance in a first direction, and the second surface of the valleys are spaced from the row by the first distance in a second direction opposite the first direction.

12. The connector subassembly of claim 10, wherein:

the insulative member comprises portions between the groups of conductive elements, the shell part comprises openings that separate the valleys into a first portion and a second portion, and the portions of the insulative member are inserted between the first and second portions of the valleys of the shell part.

13. The connector subassembly of claim 10, wherein:

the shell part comprises a plurality of subparts each comprising at least one plateaus and at least a portion of at least one valley, and the plurality of subparts are connected to each other at the valleys.

14. The connector subassembly of claim 10, wherein:

the shell part comprises a plurality of extensions each extending from one of the plateaus and surrounding one or more sides of a portion of the mounting ends of the conductive elements of the group corresponding to the plateau.

15. The connector subassembly of claim 14, wherein:

each of the plurality of extensions comprises one or more flaps aligned with respective sides and/or valleys.

16. The connector subassembly of claim 10, wherein:

the shell part is a first shell part, and the connector subassembly comprises a second shell part comprising a body portion, a plurality of mating ends extending from the body portion and disposed between the mating ends of the conductive elements of adjacent groups, and a plurality of mounting ends extending from the body portion and each corresponding to one of the plurality of mating ends, and the second shell part is attached to the first shell part at the valleys.

17. The connector subassembly of claim 16, wherein:

the second shell part comprises a plurality of rear pieces extending from the body portion and configured to form loops with corresponding extensions of the first shell part.

18. The connector subassembly of claim 16, wherein:

for the plurality of conductive elements, the mating ends comprise mating contact surfaces disposed on a first plane, and the mounting ends comprise mounting contact surfaces disposed on a second plane, and for the second shell part, the plurality of mating ends comprise mating contact surfaces disposed on the first plane, and the plurality of mounting ends comprise mounting contact surfaces disposed on the second plane.

19. A method of manufacturing a connector subassembly comprising a plurality of conductive elements each comprising a mating end, a mounting end opposite the mating end, and an intermediate portion joining the mating end and the mounting end, the method comprising:

providing a first shell part;

providing a second shell part;

molding an insulative plastic over portions of the intermediate portions of the plurality of conductive elements such that the plurality of conductive elements are disposed in a row in an edge-to-edge configuration;

inserting the plurality of conductive elements overmolded with the insulative plastic into the first shell part; and assembling the second shell part to the first shell part so as to form a shielding shell for the plurality of conductive elements.

20. The method of claim 19, wherein:

providing the first shell part comprises folding and combining one or more metal sheets;

providing the second shell part comprises folding portions of a one-piece blank to form mounting ends having mounting contact surfaces; and assembling the second shell part to the first shell part comprises disposing the mounting contact surfaces of the mounting ends of the second shell part in a same plane with mounting contact surfaces of the mounting ends of the plurality of conductive elements.

* * * * *